United States Patent
Fujine et al.

(10) Patent No.: US 9,495,921 B2
(45) Date of Patent: Nov. 15, 2016

(54) VIDEO DISPLAY DEVICE AND TELEVISION RECEIVING DEVICE WITH LUMINANCE STRETCHING

(75) Inventors: Toshiyuki Fujine, Osaka (JP); Yoji Shiraya, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 266 days.

(21) Appl. No.: 14/371,777

(22) PCT Filed: Jul. 5, 2012

(86) PCT No.: PCT/JP2012/067220
§ 371 (c)(1),
(2), (4) Date: Jul. 11, 2014

(87) PCT Pub. No.: WO2013/118321
PCT Pub. Date: Aug. 15, 2013

(65) Prior Publication Data
US 2015/0070376 A1    Mar. 12, 2015

(30) Foreign Application Priority Data
Feb. 8, 2012  (JP) .................................. 2012-024725

(51) Int. Cl.
*G09G 3/34* (2006.01)
*G09G 3/36* (2006.01)
*H04N 5/20* (2006.01)

(52) U.S. Cl.
CPC .............. *G09G 3/36* (2013.01); *G09G 3/3426* (2013.01); *H04N 5/20* (2013.01);
(Continued)

(58) Field of Classification Search
CPC ................ G09G 3/36; G09G 2360/144; G09G 2320/0271; G09G 2320/064; G09G
(Continued)

(56) References Cited

U.S. PATENT DOCUMENTS

2002/0196371 A1* 12/2002 Gai .......................... H04N 5/20
348/691
2005/0116911 A1* 6/2005 Mukai ...................... G09G 3/20
345/89
(Continued)

FOREIGN PATENT DOCUMENTS

JP    2009-63694 A    3/2009
JP    2010-271480 A    12/2010

*Primary Examiner* — Jacinta M Crawford
*Assistant Examiner* — Phuc Doan
(74) *Attorney, Agent, or Firm* — Birch, Stewart, Kolasch & Birch, LLP

(57) ABSTRACT

Areas of a video signal that represent light emission are detected, the luminance levels at which said light emission areas are displayed are enhanced, emphasizing the areas, and the luminance stretching is controlled in accordance with the brightness of the surrounding environment, thereby increasing the resulting sense of brightness and improving the appearance of the video. A light emission detector counts pixels to generate a histogram of a prescribed feature quantity and identifies areas that fall within a prescribed range at the upper end of said histogram as being light emission areas. An area-active-control/luminance-stretching portion performs luminance stretching, increasing the luminance of a backlight portion and reducing the luminance of non-light emission areas of the video signal. The area-active-control/luminance-stretching portion switches between control curves, defining the relationship between the brightness-related index and the amount of stretching, in accordance with the brightness of the surroundings of the device.

6 Claims, 15 Drawing Sheets

(52) U.S. Cl.
CPC ............... *G09G 2320/0238* (2013.01); *G09G 2320/0271* (2013.01); *G09G 2320/064* (2013.01); *G09G 2320/0626* (2013.01); *G09G 2320/0646* (2013.01); *G09G 2360/144* (2013.01); *G09G 2360/16* (2013.01)

(58) Field of Classification Search
CPC ................... 2360/16;G09G 2320/0626; G09G 3/3426; G09G 2320/0646; G09G 2320/0238; H04N 5/20
See application file for complete search history.

(56) References Cited

U.S. PATENT DOCUMENTS

| | | | |
|---|---|---|---|
| 2006/0256240 A1* | 11/2006 | Oka | ................ H04N 5/20 348/630 |
| 2007/0041636 A1* | 2/2007 | Yoon | ................ G06T 5/009 382/169 |
| 2008/0272999 A1* | 11/2008 | Kurokawa | ........... G09G 3/3406 345/89 |
| 2009/0274389 A1* | 11/2009 | Yamamoto | ............ H04N 5/57 382/274 |
| 2010/0053222 A1* | 3/2010 | Kerofsky | ............ G09G 3/3406 345/690 |
| 2010/0225574 A1* | 9/2010 | Fujiwara | ............. G09G 3/3426 345/102 |
| 2010/0302269 A1* | 12/2010 | Morimoto | ........... G09G 3/3413 345/589 |
| 2010/0328535 A1* | 12/2010 | Okui | ................ G09G 3/20 348/578 |
| 2011/0164050 A1* | 7/2011 | Adachi | ............... G09G 3/3406 345/589 |
| 2012/0169792 A1* | 7/2012 | Yamashita | ............ G02F 1/1336 345/690 |

* cited by examiner

FIG.2
(A)
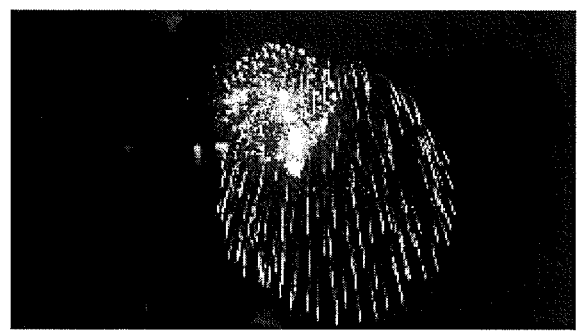
(B)
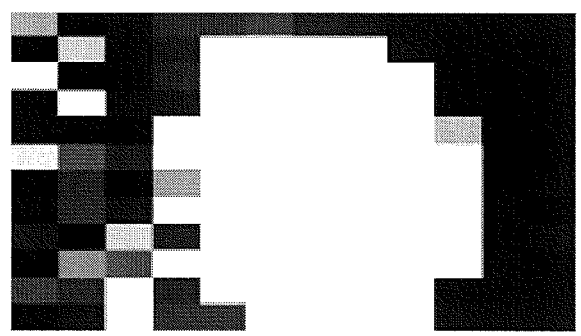

(A)

| 0 | 128 | 8 |
|---|-----|---|
| 16 | 32 | 64 |
| 96 | 96 | 0 |

(B)

BACKLIGHT LIGHTING RATE
21.7%

(C)

| 0 | 255 | 16 |
|---|-----|----|
| 32 | 64 | 128 |
| 192 | 192 | 0 |

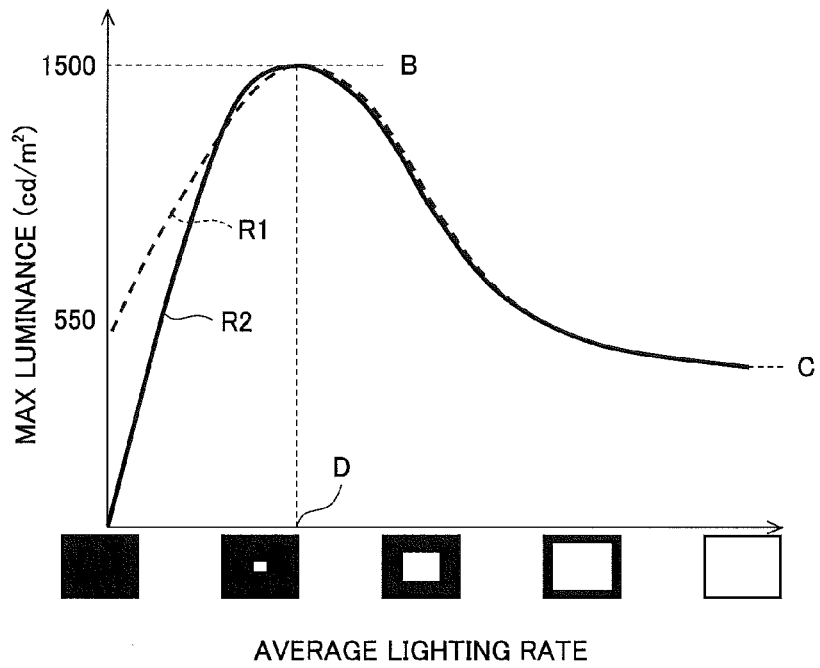
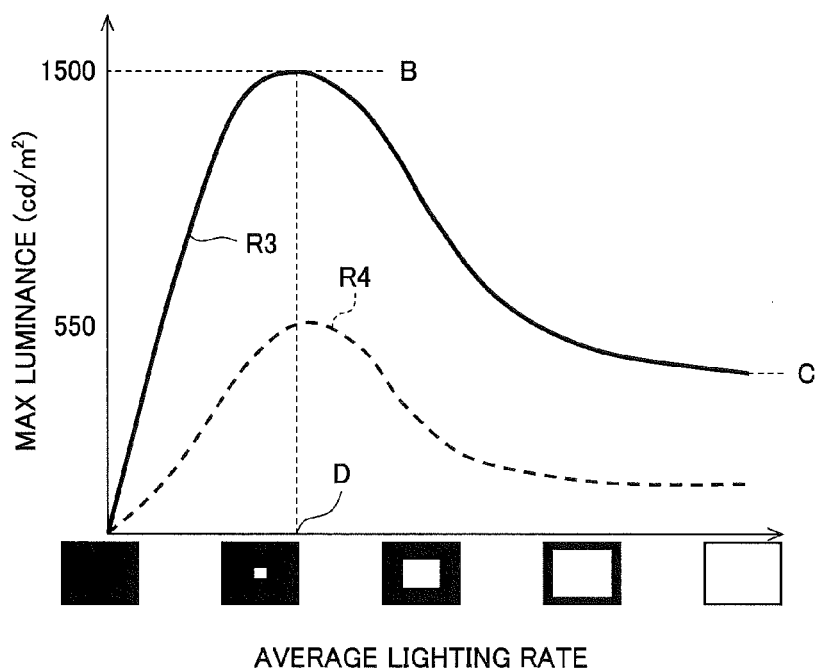

VIDEO DISPLAY DEVICE AND TELEVISION RECEIVING DEVICE WITH LUMINANCE STRETCHING

TECHNICAL FIELD

The present invention relates to a video display device and a television receiving device, and more specifically to a video display device having a luminance stretching function of a video signal and a backlight light source to improve image quality of a display video and a television receiving device.

BACKGROUND OF THE INVENTION

In recent years, as to a display technology of a television receiver, a technology of HDR (high dynamic range imaging) for displaying by reproducing what exists in nature faithfully has been studied actively. One of the objects of the HDR is that, for example, a luminescent color part such as fireworks and neon in a screen is reproduced faithfully to provide feeling of brightness.

In this case, a luminescent color and an object color are detected by a light emission detection function to be separated, and by signal processing and light emission luminance control of a backlight, only the luminescent color on the screen is able to be made brighter. Here, in a video that changes variously, a part that emits light relatively brightly is detected from a distribution of luminance of the video, and the light emitting part is stretched consciously, so that it is possible to obtain effect of improving image quality by emphasizing the part that emits light on the screen more.

As a conventional technology, for example, Patent Literature 1 discloses a display device aiming to realize appropriate screen display luminance according to a feature quantity of a video and surrounding brightness and to reduce power consumption substantially. This display device has a liquid crystal panel that displays a video by an input video signal, a backlight portion, and a brightness sensor for detecting brightness surrounding the device. In addition, according to the brightness detected by the brightness sensor, luminance conversion characteristics that prescribe light emission luminance of the backlight to the feature quantity of the input video signal (for example, APL) are changed. At this time, for changing the luminance conversion characteristics, light emission luminance is made smaller as the surroundings of a liquid crystal display device become darker and a position of characteristics changing point which is a point where an inclination of the luminance conversion characteristics is changed is moved to a direction in which the feature quantity is changed. Then, the light emission luminance of the backlight is controlled in accordance with the obtained luminance conversion characteristics.

PRIOR ART DOCUMENT

Patent Documents

Patent Document 1: Japanese Laid-Open Patent Publication No. 2010-271480

SUMMARY OF THE INVENTION

Problem to be Solved by the Invention

As described above, in the technology of the HDR, by detecting a light emitting part which is brilliant brightly in a screen and stretching display luminance of the light emitting part, contrast feeling is improved for human eyes and feeling of brightness is increased, thus making it possible to provide a high-definition display video.

However, brightness surrounding a video display device changes according to time and environment, and a way in which a display screen is seen also changes according to the surrounding brightness. When the HDR is operated under a constant condition regardless of a state of the surrounding brightness, there is a case where some videos appear dazzling to cause incongruity, and so-called black float becomes prominent to degrade quality.

For example, in such an environment where the surroundings of the video display device are dark, when screen luminance is increased uniformly by signal processing with the HDR and luminance stretching of the backlight, there is a case where feeling of dazzling is increased because of dark surroundings to cause incongruity instead. Further, in an environment where the surroundings are dark, so-called black float becomes prominent by luminance stretching, thus degrading appearance quality in some cases. On the other hand, in an environment where the surroundings of the display device are bright, feeling of dazzling and black float do not become much prominent, so that improvement of contrast feeling and feeling of brightness by luminance stretching makes it possible to improve video quality.

The video display device of the Patent Literature 1 changes luminance conversion characteristics that prescribe light emission luminance of the backlight to the feature quantity of the input video signal (for example, APL) according to the brightness detected by the brightness sensor, but is not for detecting a light emitting part to stretch the luminance at that time, and does not disclose such ideas that a light emitting part in a screen is particularly emphasized to be made brighter, and, at this time, degree of luminance stretching is controlled according to a state surrounding the device to thereby suppress feeling of dazzling and prevent degrade of video quality due to black float.

The present invention has been made in view of circumstances as described above, and aims to provide a video display device that detects apart of a video signal that emits light, and stretches and emphasizes display luminance of the light emitting part for displaying, to thereby perform display with feeling of brightness much increased and with high contrast, and at this time, controls luminance stretching according to a state of brightness surrounding the video display device to thereby represent a high-definition video without incongruity at all times, and a television receiving device.

Means for Solving the Problem

To solve the above problems, a first technical means of the present invention is a video display device comprising: a display portion for displaying an input video signal; a light source for illuminating the display portion; and a control portion for controlling the display portion and the light source, the control portion stretching and increasing luminance of the light source based on control curves that define a relation between an index associated with brightness calculated based on a predetermined condition from the input video signal and a luminance stretch quantity for stretching the luminance of the light source, and detecting a light emitting part that is regarded as a video emitting light based on a predetermined feature quantity of the input video signal, and enhancing display luminance of the light emitting part by reducing luminance of a video signal of a non-light emitting part excluding the light emitting part, wherein the video display device includes a brightness detection portion for detecting brightness surrounding the video display device, and the control portion switches the control curves according to the brightness surrounding the video display device detected by the brightness detection portion.

A second technical means is the video display device of the first technical means, wherein the control portion divides an image by the input video signal into a plurality of areas, and changes a corresponding lighting rate of the light source for each of the areas based on a tone value of a video signal of the divided area, the control curve is a control curve that defines a relation between an average lighting rate obtained by averaging the lighting rates corresponding to all areas and the luminance stretch quantity shown by possible maximum luminance on a screen of the display portion, and the control portion uses the average lighting rate as the index associated with the brightness to stretch the luminance of the light source based on the maximum luminance defined in accordance with the average lighting rate.

A third technical means is the video display device of the first technical means, wherein the control curve is a control curve that defines a relation between a score obtained by counting the number of pixels by weighting brightness of each pixel and the luminance stretch quantity with respect to a video in a predetermined range including an area of the detected light emitting part, and the control portion uses the score as the index associated with the brightness to stretch the luminance of the light source based on the score that is calculated from the input video signal.

A fourth technical means is the video display device of the first technical means, wherein the control curve is a control curve that has the luminance stretch quantity with becomes smaller as the brightness detected by the brightness detection portion reduces.

A fifth technical means is the video display device of the second technical means, wherein the control portion performs video processing for outputting by converting an input tone of the input video signal, input/output characteristics that define a relation between the input tone and an output tone have a threshold that is defined in an area of a non-light emitting part having a lower tone than that of a boundary of the light emitting part and the non-light emitting part, and the control portion predefines a relation between a gain applied to the video signal and the luminance stretch quantity, and determines a gain by which the output tone is reduced with respect to the input tone of the input video signal in accordance with the luminance stretch quantity and applies the determined gain to an area having a lower tone than the threshold to perform the video processing, and moves the threshold to a high-luminance side as the brightness detected by the brightness detection portion becomes darker in the video processing.

A sixth technical means is the video display device of the fifth technical means, wherein the control portion reduces an increment of display luminance of the display portion by stretching of the luminance of the light source through the video processing in a predetermined area having the low feature quantity.

An seventh technical means is a television receiving device including the video display device of the first technical means.

Effect of the Invention

According to the video display device of the present invention, it is possible to provide a video display device that detects a part of a video signal that emits light, and stretches and emphasizes display luminance of the light emitting part for displaying, to thereby perform display with feeling of brightness much increased and with high contrast, and at this time, controls luminance stretching according to a state of black display of a video to thereby represent a high-definition video at all times, and a television receiving device.

BRIEF DESCRIPTION OF DRAWINGS

FIG. 2 is a diagram explaining control processing of a light emitting area in an area-active-control/luminance-stretching portion.

FIG. 9 is a diagram explaining exemplary control of Max luminance that is changed according to a result of detecting surrounding brightness.

FIG. 10 is a diagram explaining another example of exemplary control of Max luminance that is changed according to a result of detecting surrounding brightness.

PREFERRED EMBODIMENT OF THE INVENTION

Embodiment 1

Figure 1:
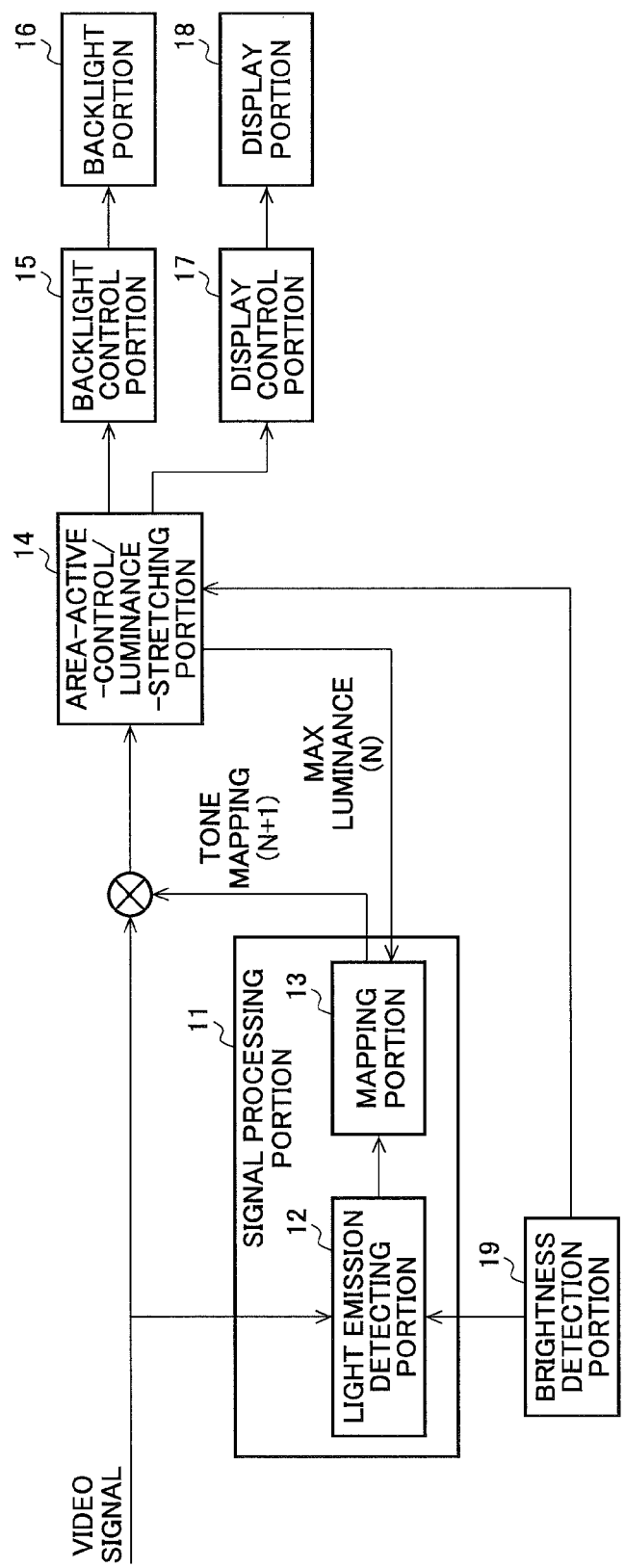
FIG. 1 is a diagram explaining an embodiment of a video display device according to the present invention, which shows a main configuration of the video display device.

FIG. 1 is a diagram explaining an embodiment of a video display device according to the present invention, which shows a main configuration of the video display device. The video display device has a configuration to perform image processing for an input video signal to display a video, and is applicable to a television receiving device and the like.

A video signal separated from a broadcast signal and a video signal input from external equipment are input to a signal processing portion 11 and an area-active-control/luminance-stretching portion 14. At this time, the video signal to the area-active-control/luminance-stretching portion 14 is applied with tone mapping generated by a mapping portion 13 of the signal processing portion 11, and then input to the area-active-control/luminance-stretching portion 14.

A light emission detecting portion 12 of the signal processing portion 11 generates a histogram for each frame based on a feature quantity of an input video signal and detects a part that emits light. The part that emits light is obtained by an average value and a standard deviation of the histogram, and is detected as a relative value for each histogram.

A brightness detection portion 19 is provided with a brightness sensor that detects brightness surrounding the video display device (surrounding illumination). As the brightness sensor, for example, a photodiode is applicable. A detection result by the brightness detection portion is output to the light emission detecting portion 12 and the area-active-control/luminance-stretching portion 14.

The mapping portion 13 generates tone mapping by using information of the light emitting part detected by the light emission detecting portion 12 and Max luminance output from the area-active-control/luminance-stretching portion 14 to apply to the input video signal. The Max luminance shows maximum luminance that is desired to be displayed on a screen and corresponds to a luminance stretch quantity of a backlight.

In accordance with the video signal that is input, the area-active-control/luminance-stretching portion 14 divides an image by the video signal into predetermined areas, and extracts a predetermined statistical value, such as a maximum tone value, of the video signal for each divided area. Then, a lighting rate of a backlight portion 16 is calculated based on the maximum tone value or the like. The lighting rate is defined for each area of the backlight portion 16 corresponding to a divided area of a video. In addition, the backlight portion 16 is configured by a plurality of LEDs and is able to control luminance for each area.

The lighting rate in each area of the backlight portion 16 is determined based on a predefined operation expression, in which operation is performed basically in such a way as to keep luminance of an LED without reducing in a bright high-tone area with a maximum tone value while reducing luminance of an LED in a dark low-tone area.

Then, the area-active-control/luminance-stretching portion 14 calculates an average lighting rate of the entire backlight portion 16 from a lighting rate of each area, and according to the average lighting rate, calculates a luminance stretch quantity of the backlight portion 16 by a predetermined operation expression. Thereby, a possible maximum luminance value (Max luminance) of an area in a screen is obtained. With respect to Max luminance obtained here, Max luminance is adjusted based on a result of detecting brightness surrounding the device by the brightness detection portion 19, and output to the mapping portion 13 of the signal processing portion 11.

In the area-active-control/luminance-stretching portion 14, then, Max luminance adjusted according to the result of detecting surrounding brightness is returned to the signal processing portion 11 to reduce luminance corresponding to a quantity of luminance stretching of the backlight portion 16. At this time, the luminance stretching is given to the entire backlight portion 16, and reduction of luminance by video signal processing is performed for a part that is regarded as not emitting light, excluding a light emitting part. Thereby, screen luminance of only the part that emits light is increased, thus making it possible to perform video representation with high contrast and improve image quality.

The area-active-control/luminance-stretching portion 14 outputs control data for controlling the backlight portion 16 to a backlight control portion 15, and the backlight control portion 15 controls light emission luminance of the LED of the backlight portion 16 for each divided area based on the data. Luminance of the LED of the backlight portion 16 is subjected to PWM (Pulse Width Modulation) control, and is also able to be controlled to have a desired value by current control or a combination thereof.

Further, the area-active-control/luminance-stretching portion 14 outputs control data for controlling a display portion 18 to a display control portion 17, and the display control portion 17 controls display of the display portion 18 based on the data. A liquid crystal panel that displays an image with illumination by the LED of the backlight portion 16 is used for the display portion 18.

Note that, in the present embodiment, a control portion of the present invention is for controlling the backlight portion 16 and the display portion 18, and corresponds to the signal processing portion 11, the area-active-control/luminance-stretching portion 14, the backlight control portion 15 and the display control portion 17.

When the above-described display device is configured as a television receiving device, the television receiving device has means for selecting a broadcast signal received by an antenna for demodulating and decoding to generate a video signal for playing, and applies predetermined image processing as appropriate to the video signal for playing for inputting as the input video signal of FIG. 1. This makes it possible to cause the display portion 18 to display the received broadcast signal. The present invention is able to be configured as a video display device, and a television receiving device provided with the video display device.

More specific description will be given below for exemplary processing of each portion of the present embodiment having the above-described configuration.

Figure 3:
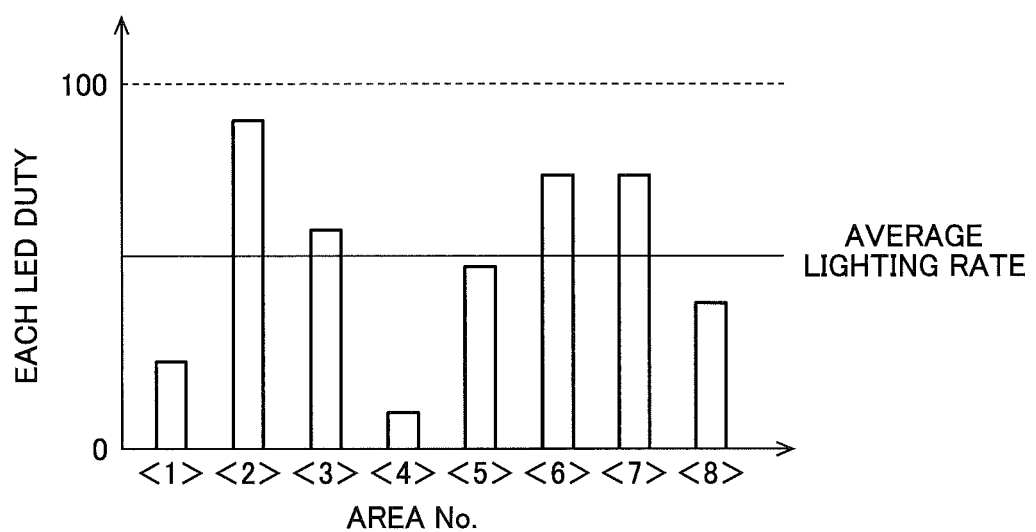
FIG. 3 is another diagram explaining control processing of a light emitting area in the area-active-control/luminance-stretching portion.

The area-active-control/luminance-stretching portion 14 divides a video into a predetermined plurality of areas, and controls light emission luminance of the LED corresponding to the divided areas for each area. FIG. 2 to FIG. 3 are diagrams explaining control processing of a light emitting area in the area-active-control/luminance-stretching portion 14. The area active control applied to the present embodiment is for dividing a video into a predetermined plurality of areas and controlling light emission luminance of the LED corresponding to the divided areas for each area.

Here, the area-active-control/luminance-stretching portion 14 divides a video of one frame into a predefined plurality of areas based on an input video signal, and extracts a maximum tone value of the video signal for each divided area. For example, a video as shown in FIG. 2(A) is divided into a predefined plurality of areas. Here, the maximum tone value of the video signal for each area is extracted. In another example, not the maximum tone value but other statistical values such as an average tone value of the video signal may be used. Description will be given below with an example in which a maximum tone value is extracted.

The area-active-control/luminance stretching portion 14 determines a lighting rate of the LED for each area according to the extracted maximum tone value. A situation in the lighting rate of the LED of each area at this time is shown in FIG. 2(B). Bright display is performed with the lighting rate of the LED increased for a bright part where a tone of the video signal is high. Processing at this time will be described more specifically.

An example of a situation when a maximum tone value of each divided area of one frame is extracted is shown in FIG. 3. In FIG. 3, for simplifying description, it is set that a screen of one frame is divided into eight areas (areas <1> to <8>). Lighting rates of the respective areas (areas <1> to <8>) are shown in FIG. 3(A), and lighting rates of the respective areas and an average lighting rate of the entire screen are shown in FIG. 3(B). Here, from a maximum tone value in each area, a lighting rate of the LED of the backlight in the area is calculated. The lighting rate is able to be indicated by, for example, a drive duty of the LED. In this case, the Max lighting rate is 100%.

When determining the lighting rate of the LED of each area, the lighting rate is decreased to reduce the luminance of the backlight for a dark area where the maximum tone value is low. As an example, when being represented by 8-bit data with a tone value of a video of 0 to 255, if the maximum tone value is 128, the backlight is reduced to $(1/(255/128))^{2.2}=0.217$ time (21.7%).

In the example of FIG. 3, the lighting rate of the backlight is determined in a range of 10 to 90% for each area. This method for calculating a lighting rate shows an example thereof, and the light rate in each area is calculated in accordance with a predefined operation expression basically so as not to reduce backlight luminance in a bright high-tone area but to reduce luminance of the backlight in a dark low-tone area.

Then, lighting rates of the backlight for each area calculated from the maximum tone value of the video signal are averaged to calculate the average lighting rate of the backlight in one frame. In this example, the average lighting rate becomes a level of the average lighting rate shown in FIG. 3(B). The average lighting rate is an example of an index associated with brightness according to the present invention.

Figure 4:
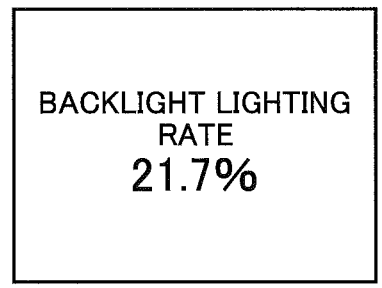
FIG. 4 is a diagram specifically explaining determination processing of an average lighting rate.

FIG. 4 is a diagram explaining determination processing of the average lighting rate more specifically. As described above, when determining the lighting rate of the LED of each area, the lighting rate is decreased to reduce the luminance of the backlight for a dark area where the maximum tone value is low. Here, the actual lighting rate in each area is determined so that tone which is desired to be displayed is displayed correctly and the LED duty is reduced as much as possible. While it is desired to reduce the LED duty as much as possible in each area, it is necessary to perform display correctly without collapsing tone which is desired to be displayed, so that the LED duty by which the maximum tone in the area is able to be displayed and the LED duty is reduced as much as possible (tentative lighting rate) is set and tone of the display portion 18 (here, LCD panel) is set based on it.

As an example, description will be given for a case of being represented by 8-bit data with a tone value of a video of 0 to 255 and a case where tone values of a plurality of pixels in one area of FIG. 3(A) are shown in FIG. 4(A). Here, it is set that nine pixels correspond to one area. In a pixel group shown in FIG. 4(A), the maximum tone value is 128, and in this case, as shown in FIG. 4(B), a lighting rate of the backlight in the area is reduced to $(1/(255/128))^{2.2}=0.217$ time (21.7%).

Further, as an example, the area-active-control/luminance stretching portion 14 determines the lighting rate in this manner and calculates a tone value for each pixel in the display portion 18 by considering the lighting rate for the area in which the pixel is included. For example, when the tone value that is desired to be displayed is 96, 96/(128/255)=192, so that the pixel may be represented using the tone value of 192. In the same manner, a result of calculating tone values when being displayed for each pixel of FIG. 4(A) is shown in FIG. 4(C).

The actual luminance of the backlight portion 16 is further stretched and intensified based on a value of Max luminance determined according to the average lighting rate. Reference luminance as an origin thereof is, for example, such luminance that screen luminance at a time of the maximum tone value is 550 (cd/m$^2$). The reference luminance is not limited to this example and is able to be defined as appropriate.

Figure 5:
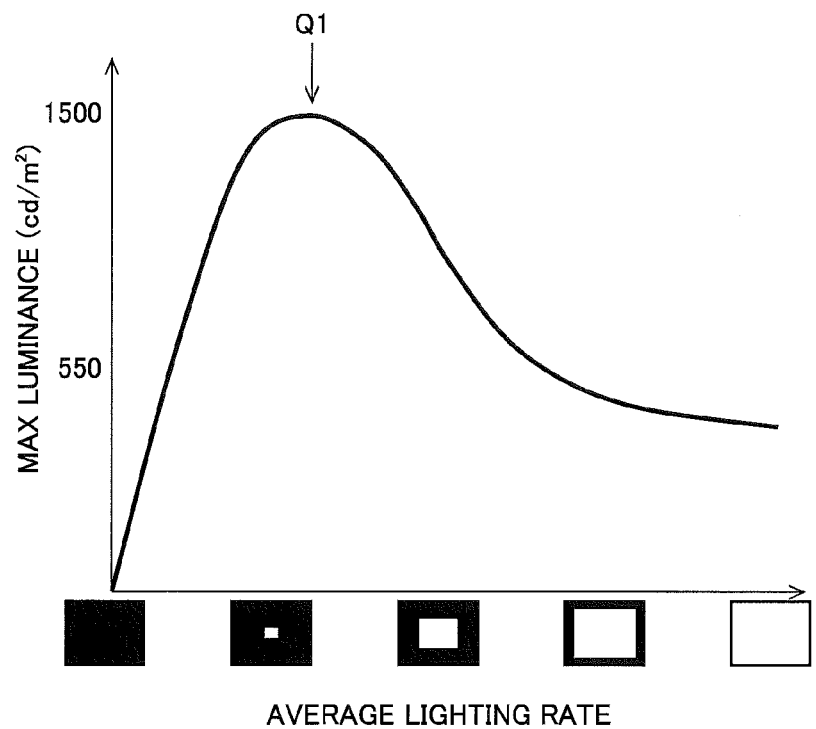
FIG. 5 is a diagram explaining exemplary processing of the area-active-control/luminance-stretching portion.

FIG. 5 is a diagram explaining exemplary processing of the area-active-control/luminance-stretching portion 14. As described above, the area-active-control/luminance-stretching portion 14 calculates the average lighting rate of the entire screen from the lighting rates determined according to the maximum tone value in each area. When an area in which the lighting rate is high is increased, the average lighting rate of the entire screen becomes higher. Then, a possible maximum value of luminance (Max luminance) in a relation like FIG. 5 is determined. A horizontal axis indicates a lighting rate of the backlight (window size) and a vertical axis indicates screen luminance in Max luminance (cd/m$^2$). The average lighting rate is able to be expressed as a ratio of a lit area (window area) with the lighting rate of 100% to an unlit area with the lighting rate of 0%. The lighting rate is 0 in a state of having no lit area, and the lighting rate increases as a window of a lit area becomes larger and the lighting rate reaches 100% when completely lit.

In FIG. 5, it is set that Max luminance when the back light is completely lit (average lighting rate of 100%) is, for example, 550 (cd/m$^2$). Then, as the average lighting rate decreases, Max luminance is increased. At this time, a pixel having a tone value of 255th tone (in the case of 8-bit representation) has the highest screen luminance in the screen, which is possible maximum screen luminance (Max luminance). Accordingly, it is found that, even with the same average lighting rate, the screen luminance is not upped by Max luminance depending on the tone value of the pixel.

When the average lighting rate is Q1, Max luminance has the largest value, and the maximum screen luminance at this time is 1500 (cd/m$^2$). That is, the possible maximum screen luminance at Q1 is to be stretched to 1500 (cd/m$^2$) compared to 550 (cd/m$^2$) when completely lit. Q1 is set at a position where the average lighting rate is relatively low. That is, in the case of such a screen that is a wholly dark screen having low average lighting rate and that has a high-tone peak partially, the luminance of the backlight is stretched to be 1500 (cd/m$^2$) at a maximum. Further, as a reason why degree of stretching of the luminance of the backlight is small as the average lighting rate becomes higher, because it feels dazzling instead when performing excessively for the luminance of the backlight in an originally bright screen, it is required to suppress degree of stretching.

While Max luminance is from the maximum average lighting rate of Q1 to the average lighting rate of 0 (perfectly black), the value of Max luminance is gradually reduced. In a predetermined area where the average lighting rate is the lowest, the screen luminance is further reduced than 550 (cd/m$^2$) when completely lit. That is, by using a case of being completely lit as a reference, the screen luminance is to be stretched to the minus side. A range where the average lighting rate is low corresponds to a video on a dark screen, and rather than the luminance of the backlight is stretched to up the screen luminance, the luminance of the backlight is suppressed to the contrary to improve contrast feeling and black float is suppressed to keep display quality.

The area-active-control/luminance-stretching portion 14 stretches the luminance of the backlight in accordance with a curve of FIG. 5, and outputs a control signal thereof to the backlight control portion 15. Here, the average lighting rate changes according to the maximum tone value detected for each divided area of the video as described above, and a state of luminance stretching changes according to the average lighting rate.

A video signal input to the area-active-control/luminance-stretching portion 14 is applied with tone mapping generated by signal processing of the signal processing portion 11 described below to be input having a low-tone area with gain decreased. Thereby, the luminance is reduced by video signal processing by a quantity of the stretched luminance of the backlight in a non-light emitting area with low tone, resulting that screen luminance is enhanced only in an area that emits light, thus increasing feeling of brightness.

The area-active-control/luminance-stretching portion 14 outputs the value of Max luminance obtained from the average lighting rate of the backlight and the detection result of the brightness detection portion 19 in accordance with the curve of FIG. 5 to the mapping portion 13 of the signal processing portion 11. The mapping portion 13 performs tone mapping using Max luminance output from the area-active-control/luminance-stretching portion 14.

The signal processing portion 11 will be described.

Figure 6:
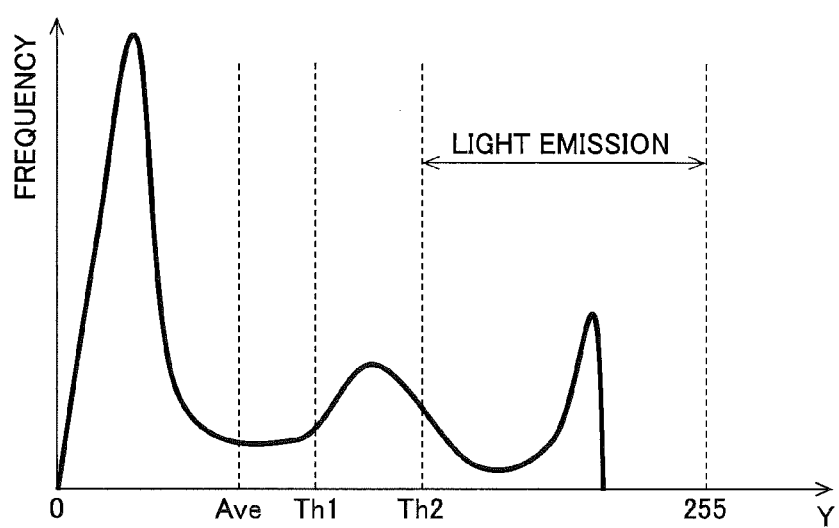
FIG. 6 is a diagram showing an example of a Y histogram generated from a luminance signal Y.

The light emission detecting portion 12 of the signal processing portion 11 detects a part that emits light from a video signal. FIG. 6 shows an example of a Y histogram generated from a luminance signal Y. The light emission detecting portion 12 integrates the number of pixels for each luminance tone to generate a Y histogram for each frame of an input video signal. A horizontal axis indicates a tone value of luminance Y, and a vertical axis indicates the number of pixels integrated for each tone value (frequency). The luminance Y is one of feature quantities of a video for which a histogram is generated, and another example of feature quantities will be described below. Here, it is set to detect a light emitting part as to the luminance Y.

When the Y histogram is generated, an average value (Ave) and a standard deviation (σ) are calculated from the Y histogram, which are used for calculating two thresholds Th.

A second threshold Th2 is for defining a light emitting boundary, and in the Y histogram, processing is performed for pixels not less than the threshold Th2 which are regarded as a light emitting part.

The second threshold Th2 is provided by:

$$Th2=Ave+N\sigma \qquad \text{expression (1)}$$

N is a predetermined constant.

In addition, a first threshold Th1 is set so as to suppress incongruity in tones of an area smaller than Th2 and the like, and provided by:

$$Th1=Ave+M\sigma \qquad \text{expression (2)}$$

M is a predetermined constant, and M<N. Further, a value of M changes according to a result of detecting surrounding brightness by the brightness detection portion 19.

The values of the first and second thresholds Th1 and Th2 detected by the light emission detecting portion 12 are output to the mapping portion 13 and used to generate tone mapping.

Figure 7:
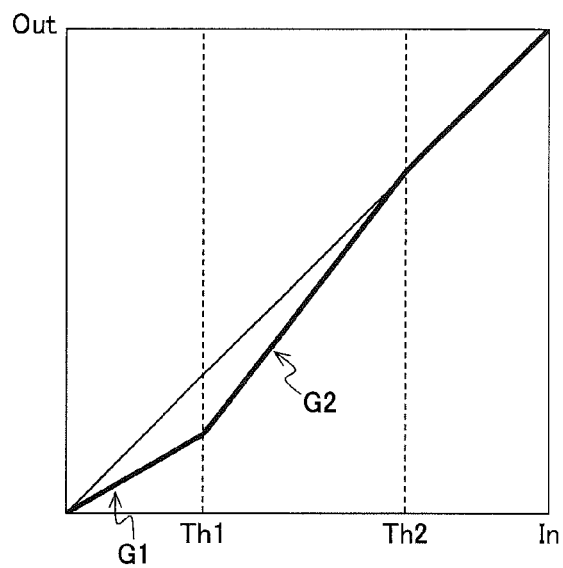
FIG. 7 is a diagram showing an example of tone mapping generated by a mapping portion.

FIG. 7 is a diagram showing an example of tone mapping generated by the mapping portion 13. A horizontal axis is an input tone of a luminance value of a video, and a vertical axis is an output tone. A pixel not less than the second threshold Th2 detected by the light emission detecting portion 12 is a part that emits light in the video, and a compression gain is applied excluding the part that emits light for decreasing a gain. At this time, when a constant compression gain is uniformly applied to an area smaller than Th2 serving as a light emitting boundary to suppress the output tone, there is incongruity arising in tones. Therefore, the first threshold Th1 is set and detected at the light emission detecting portion 12, a first gain G1 is set to an area smaller than Th1, and a second gain G2 is set so as to linearly connect between Th1 and Th2 to perform tone mapping.

Description will be given for a method for setting a gain.

A value of Max luminance is input from the area-active-control/luminance-stretching portion 14 to the mapping portion 13. As described above, Max luminance shows maximum luminance that is defined by an average lighting rate of the backlight and a result of detecting surrounding brightness by the brightness detection portion 19, and is input, for example, as a value of backlight duty.

The first gain G1 is applied to an area smaller than the first threshold Th1, and is set by:

$$G1=(Ls/Lm)^{1/\gamma} \qquad \text{expression (3)}$$

Ls is reference luminance (reference luminance when backlight luminance is not stretched; as an example, luminance when maximum screen luminance becomes 550 cd/m$^2$), and Lm is Max luminance output from the area-active-control/luminance-stretching portion 14. Accordingly, the first gain G1 that is applied to the area smaller than the first threshold Th1 lowers an output tone of a video signal so as to reduce an increment of screen luminance by luminance stretching of the backlight.

In tone mapping for the second threshold Th2 or more, it is set as f(x)=x. That is, it is set as an input tone=an output tone, and processing for reducing the output tone is not performed. It is set so that the output tone of the first threshold Th1 reduced by the first gain G1 and the output tone of the first threshold Th1 are connected with a straight line from the first threshold Th1 to the second threshold Th2.

That is, the second gain G2 is determined by:

$$G2=(Th2-G1\cdot Th1)/(Th2-Th1) \qquad \text{expression (4)}$$

By the above-described processing, tone mapping as shown in FIG. 7 is obtained. At this time, for a connecting part of Th1 and Th2, a predetermined range (for example, connecting part±Δ (Δ is a predetermined value)) may be subjected to smoothing by a quadratic function.

The tone mapping generated by the mapping portion 13 is applied to an input video signal, and the video signal in which output of a low-tone part is suppressed based on a luminance stretch quantity of the backlight is input to the area-active-control/luminance-stretching portion 14.

Figure 8:
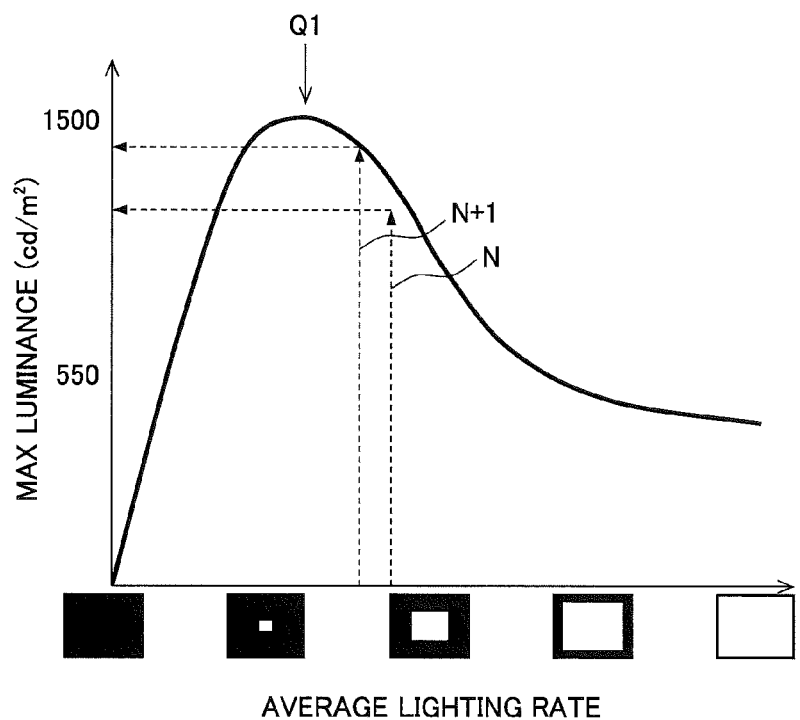
FIG. 8 is a diagram explaining Max luminance output by the area-active-control/luminance-stretching portion.

FIG. 8 is a diagram explaining Max luminance output by the area-active-control/luminance-stretching portion 14.

The area-active-control/luminance-stretching portion 14 inputs the video signal to which tone mapping generated by the mapping portion 13 is applied, and performs area active control based on the video signal to determine Max luminance based on an average lighting rate. At this time, though a control curve of Max luminance changes according to a result of detecting surrounding brightness by the brightness detection portion 19, brightness detection is not considered here for description.

It is set that pa frame that is determined based on the above-described average lighting rate is an N frame. A value of Max luminance of the N frame is output to the mapping portion 13 of the signal processing portion 11. At the mapping portion 13, Max luminance of the N frame that is input is used to generate tone mapping shown in FIG. 7, which is applied to a video signal of an N+1 frame.

In this manner, Max luminance based on an area-active average lighting rate is given feedback to be used for tone mapping for a next frame. The mapping portion 13 applies a gain for reducing video output for the area that is smaller than the first threshold Th1 (first gain G1) based on Max luminance determined in the N frame. The second gain G2 for linearly connecting between Th1 and Th2 is applied to an area between Th1 and Th2 to reduce video output between Th1 and Th2.

Because the gain for reducing video output is applied in the N frame, in an area having a high lighting rate in which an average lighting rate is not less than Q1, the N+1 frame has a trend that a maximum tone value for each area is reduced so that a lighting rate is reduced, and thereby, the N+1 frame has a trend that Max luminance increases. This causes a trend that a luminance stretch quantity of the backlight is further increased to increase feeling of brightness on a screen. However, these trends are not found in an area having a lighting rate lower than Q1, and an opposite trend is found.

Next, description will be given for detection processing of the brightness detection portion 19 of the signal processing portion 11. In the embodiment according to the present invention, the control curve of Max luminance according to an average lighting rate as shown in FIG. 5 above is changed according to a result of detecting surrounding brightness in the brightness detection portion 19.

(Exemplary Control of Luminance of Backlight Based on Brightness Detection)

As described above, the area-active-control/luminance-stretching portion 14 inputs the video signal to which tone mapping generated by the mapping portion 13 is applied, and performs area active control based on the video signal to determine Max luminance based on an average lighting rate. At this time, in the area-active-control/luminance-stretching portion 14, a control curve of Max luminance is differentiated according to the result of detecting surrounding brightness in the brightness detection portion 19, which is made such a curve that screen luminance becomes lower in a predetermined area having a low average lighting rate as the surroundings become darker, or a gradual curve for relation between an average lighting rate and Max luminance, thereby reducing Max luminance entirely.

Moreover, at the same time, in the mapping portion 13, according to the result of detecting surrounding brightness in the brightness detection portion 19, when the surroundings are dark, the first threshold Th1 is shifted to a side where a feature quantity of luminance or the like is high, thereby a tone in a dark area is made much lower by video signal processing to obtain contrast feeling.

FIG. 9 is a diagram explaining exemplary control of Max luminance that is changed according to a result of detecting surrounding brightness.

As described above, the area-active-control/luminance-stretching portion 14 calculates an average lighting rate of the entire screen from lighting rates determined according to a maximum tone value of each area and the like. When an area having a high lighting rate increases, the average lighting rate of the entire screen becomes high. Then, a possible maximum value of luminance (Max luminance) is determined with a relation like in FIG. 9.

At this time, according to the result of detecting surrounding brightness by the brightness detection portion 19, a control curve that defines a relation between Max luminance and the average lighting rate in FIG. 9 is changed. For example, as shown in FIG. 9, the control curve of Max luminance is prepared in two steps for controlling with a control curve R1 when surrounding brightness is bright, and controlling with a control curve R2 in a dark case. As to the bright case and the dark case, a predetermined threshold is set to a signal showing a result of brightness detection and the threshold is compared to the detection result to judge whether the surroundings are brighter or darker than a predetermined level. For example, when surrounding illumination (lux) is detected by a brightness sensor with photodiode, a threshold of illumination is predefined and whether to be a bright environment or a dark environment is judged in accordance with the surrounding illumination based on the detection result. Further, by providing multiple-step thresholds, control may be performed according to multiple-step surrounding illumination.

In the control curve of FIG. 9, a level of the highest Max luminance in an entire range of the average lighting rate is B, a Max luminance level when the average lighting rate is 100% is C, and the average lighting rate having the highest Max luminance is D. In this case, in the control curve R1 for the case of bright surroundings, B is about 1500 cd/m$^2$ and C is about 550 cd/m$^2$, so that B is set to have luminance difference which is about three times of C. In the control curve R1, Max luminance is set high to some extent even for an area of a dark video having a low average lighting rate, to provide a video that appears bright in a bright surrounding environment. Even when the average lighting rate is 0%, Max luminance at this time is set as 550 cd/m$^2$.

On the other hand, in the control curve R2 for the case of dark surroundings, Max luminance is made to be lower than the control curve R1 when a surrounding environment is bright in an area of a dark video having a low average lighting rate within a predetermined range. In this case, Max luminance at a minimum lighting rate (lighting rate of 0%) is 0 (cd/m$^2$), and the backlight is completely unlit at this time. That is, with 550 cd/m$^2$ at the level C as a reference, the backlight is to be stretched to the minus side in a predetermined area of a low lighting rate.

In the control curve R2, it is focused in the area of the dark video to suppress feeling of dazzling in a dark surrounding environment rather than emphasizing brightness of the screen by increasing Max luminance. Further, in the area of the dark video, when luminance stretching is performed by increasing Max luminance, feeling of black float becomes prominent, so that Max luminance is kept low so that black float does not become prominent. In this example, a position of the average lighting rate B having Max luminance is not changed depending on surrounding brightness to be maintained.

Moreover, though the control curve is set in two steps in the example of FIG. 9, it is possible to control in a plurality of steps of three or more steps without limitation to two steps. In addition, a control curve may be generated for each time so as to change in a stepless manner according to surrounding brightness (surrounding illumination) detected by the brightness detection portion 19.

FIG. 10 is a diagram explaining another example of exemplary control of Max luminance that is changed according to a result of detecting surrounding brightness. In the example of FIG. 10, though a control curve that defines a relation between Max luminance and the average lighting rate is changed according to the result of detecting surrounding brightness by the brightness detection portion 19 in the same manner as the example of FIG. 9, a setting method thereof is different from the control curve of FIG. 9. In the example of FIG. 10, the control curve of Max luminance is prepared in two steps, in which when surrounding brightness is bright, control is performed with a control curve R3, and when surrounding brightness is dark, control is performed with a control curve R4. As to the bright case and the dark case, a predetermined threshold is set to a signal showing a detection result and the threshold is compared to the detection result to judge whether the surroundings are brighter or darker than a predetermined level, in the same manner as the above.

In the control curve R3 for the case of bright surroundings, B is about 1500 $cd/m^2$ and C is about 550 $cd/m^2$, so that B is set to have luminance difference which is about three times of C. In addition, Max luminance is set to be lower than the level C when completely lit in an area of a dark video having a low average lighting rate, and Max luminance is 0 ($cd/m^2$) when the average lighting rate is 0% and the backlight is completely unlit at this time.

Thereby, in the control curve R3 for the case of bright surroundings, feeling of brightness is increased by luminance stretching by high Max luminance and luminance is reduced by video signal processing in an area excluding a light emitting part, thus making it possible to represent a high-definition video having high contrast feeling. Further, in a dark area having an almost minimum average lighting rate, Max luminance is reduced so as to reduce black float of a dark video.

On the other hand, in the control curve R4 for the case of dark surroundings, the control curve is made gradual entirely compared to the control curve R3 and Max luminance is set to be lower than the control curve R3 as a whole. In this case, the level B having the highest Max luminance is suppressed to about 550 $cd/m^2$ in R4 as against about 1500 $cd/m^2$ in R3. In an environment where the surroundings are dark, Max luminance is set low to thereby suppress feeling of dazzling. Further, in an area where a video is dark having a low average lighting rate, Max luminance is further reduced than the control curve R3. Since feeling of black float on the screen by luminance stretching becomes more prominent in a dark surrounding environment, Max luminance is kept low so that black float does not become prominent. In this example, a position of the average lighting rate D having Max luminance is not changed depending on surrounding brightness to be maintained.

Note that, though the control curve is set in two steps in the example of FIG. 10, it is possible to control in a plurality of steps of three or more steps without limitation to two steps. In addition, a control curve may be generated for each time so as to change in a stepless manner according to surrounding brightness.

For example, as exemplary setting when the control curve is set in three steps, it is possible to set such that when surrounding illumination is 400 lux, the level B is 1500 $cd/m^2$ and the level C is 550 $cd/m^2$, when surrounding illumination is 200 lux, the level B is 900 $cd/m^2$ and the level C is 300 $cd/m^2$, and when surrounding illumination is 500 lux, the level B is 450 $cd/m^2$ and the level C is 150 $cd/m^2$. In this case, proportion of the level B to the level C is set to about 1.5 to 3 times, and also when a completely lighting rate is 100%, Max luminance is reduced with reduction of surrounding illumination.

Figure 11:
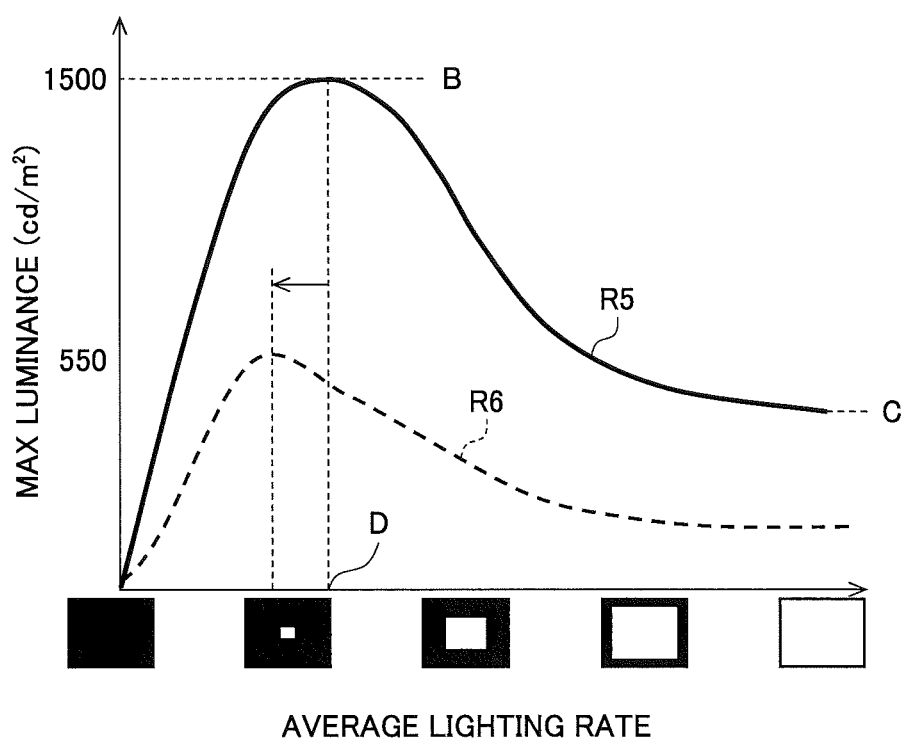
FIG. 11 is a diagram explaining still another example of exemplary control of Max luminance that is changed according to a result of detecting surrounding brightness.

FIG. 11 is a diagram explaining still another example of exemplary control of Max luminance that is changed according to a result of detecting surrounding brightness. In the example of FIG. 11, a control curve that defines a relation between Max luminance and the average lighting rate is changed according to the result of detecting surrounding brightness by the brightness detection portion 19 in the same manner as the example of FIG. 10. Here, the control curve of Max luminance is prepared in two steps, in which when surrounding brightness is bright, control is performed with a control curve R5, and when surrounding brightness is dark, control is performed with a control curve R6. As to the bright case and the dark case, a predetermined threshold is set to a signal showing a detection result and the threshold is compared to the detection result to judge whether the surroundings are brighter or darker than a predetermined level, in the same manner as the above.

In the control curve R5 for the case of bright surroundings, B is about 1500 $cd/m^2$ and C is about 550 $cd/m^2$, so that B is set to have luminance difference which is about three times of C. In addition, Max luminance is set to be lower than the level C when completely lit in an area of a dark video having a low average lighting rate, and Max luminance is 0 ($cd/m^2$) when the average lighting rate is 0% and the backlight is completely unlit at this time.

Thereby, in the control curve R3 for the case of bright surroundings, feeling of brightness is increased by luminance stretching by high Max luminance and luminance is reduced by video signal processing in an area excluding a light emitting part, thus making it possible to represent a high-definition video having high contrast feeling. Further, in a dark area having an almost minimum average lighting rate, Max luminance is reduced so as to reduce black float of a dark video.

On the other hand, in the control curve R6 for the case of dark surroundings, the control curve is made gradual entirely compared to the control curve R5 and Max luminance is set to be lower than the control curve R5 as a whole. In this case, the level B having the highest Max luminance is suppressed to about 550 $cd/m^2$ in R6 as against about 1500 $cd/m^2$ in R5.

In the control curve R6, Max luminance is set low to thereby suppress feeling of dazzling in an environment where the surroundings are dark. Further, in an area where a video is dark having a low average lighting rate, Max luminance is further reduced than the control curve R5 and Max luminance is kept low so that black float does not become more prominent.

In addition, in the control curve R6, a position D of the average lighting rate having Max luminance is shifted to the low average lighting rate side with respect to the control curve R5. This makes it possible to focus and reproduce a brilliant part having a relatively small area even in an entirely dark video.

Note that, though the control curve is set in two steps in the example of FIG. 11, it is possible to control in a plurality of steps of three or more steps without limitation to two steps. In addition, a control curve may be generated for each time so as to change in a stepless manner according to surrounding brightness.

Figure 12:
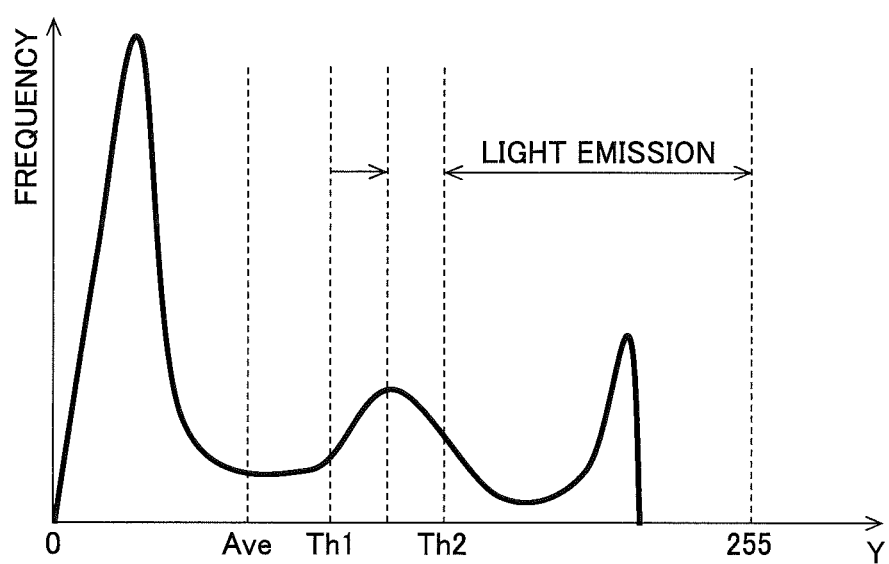
FIG. 12 is a diagram explaining a first threshold that is changed according to a result of detecting surrounding brightness.

FIG. 12 is a diagram explaining the first threshold that is changed according to a result of detecting surrounding brightness. As described above, the light emission detecting portion 12 integrates the number of pixels for each luminance tone to generate a Y histogram for each frame of an input video signal. Then, an average value (Ave) and a standard deviation ($\sigma$) are calculated from the Y histogram, and the second threshold Th2 that defines a light emitting boundary and the first threshold Th1 for suppressing incongruity in tones of an area smaller than Th2 and the like (Th1=Ave+M$\sigma$) are set.

At this time, a position of the first threshold Th1 of FIG. 12 is changed according to the result of detecting surrounding brightness by the brightness detection portion 19. Specifically, a value of "M" in Th1=Ave+M$\sigma$ is changed to change the position of Th1 in a luminance direction of the histogram. At this time, the position of the first threshold Th1 may be set in advance in multiple steps according to the detection result of the brightness detection portion 19, or the position of the first threshold Th1 may be set so as to change in a stepless manner according to the result of detecting brightness.

For example, as shown in FIG. 12, as the brightness detected by the brightness detection portion 19 becomes darker, the value of M is increased and the first threshold Th1 is shifted to a high-luminance side. Thereby, the position of the first threshold Th1 is shifted to the high-luminance side in an environment where the surroundings are dark and sharpness of image quality is emphasized in the dark environment, thereby having image quality focusing contrast feeling. On the other hand, in an environment where the surroundings are bright, the first threshold Th1 is maintained on a low-luminance side to have image quality focusing brightness of a screen.

Figure 13:
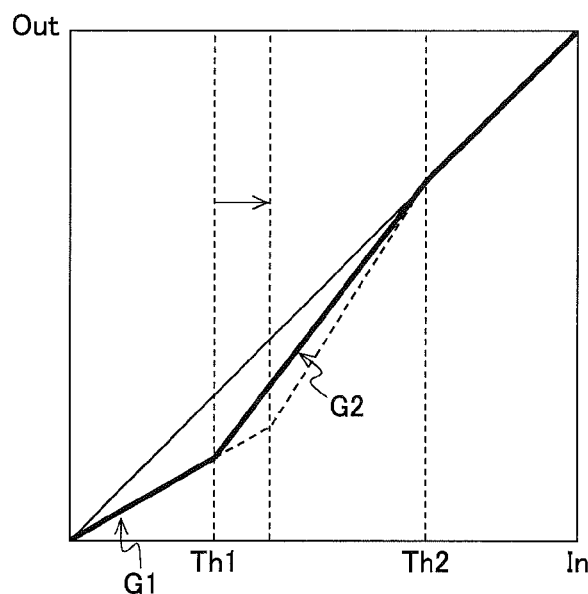
FIG. 13 is a diagram explaining an example of tone mapping according to brightness detection.

FIG. 13 is a diagram explaining an example of tone mapping according to brightness detection. As described above, the mapping portion 13 sets the first gain G1 to an area smaller than the first threshold Th1 and sets the second gain G2 so as to linearly connect between Th1 and Th2 to perform tone mapping. At this time, the tone mapping is performed in accordance with the position of the first threshold Th1 that is determined according to the result of detecting surrounding brightness by the brightness detection portion 19. In this case, as shown in FIG. 12, as surrounding brightness becomes darker, the first threshold Th1 shifts to the high-luminance side, so that atone in a low-luminance area is kept low in a wider range, thus enabling image quality focusing contrast feeling more.

Figure 14:
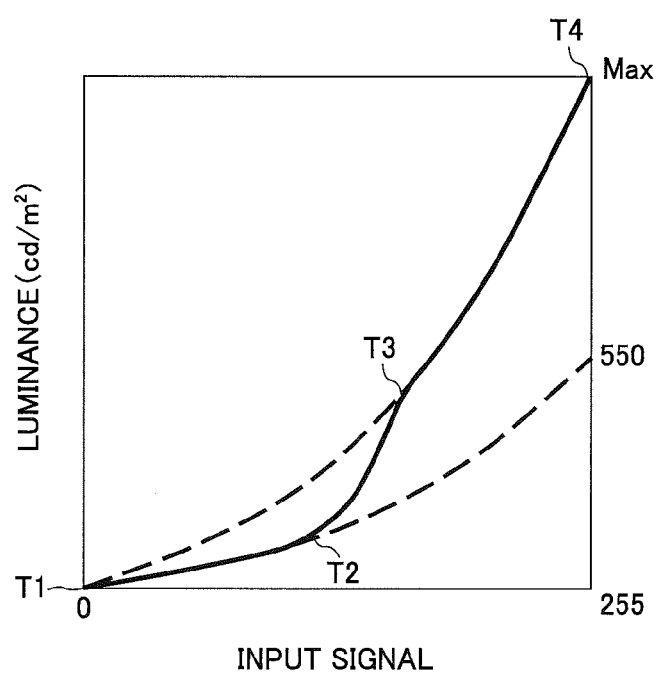
FIG. 14 is a diagram showing a state where screen luminance is enhanced by processing of the area-active-control/luminance-stretching portion 14.

FIG. 14 is a diagram showing a state where screen luminance is enhanced by processing of the area-active-control/luminance-stretching portion 14. A horizontal axis is a tone value of an input video signal and a vertical axis is screen luminance (cd/m$^2$) of the display portion 18.

T2 and T3 correspond to positions of tone values of the first and second thresholds Th1 and Th2 used in the light emission detecting portion 12, respectively. In an area not less than the second threshold Th2 detected by the light emission detecting portion 12 as described above, signal processing for reducing an output tone of a video signal according to a luminance stretch quantity of the backlight is not performed. As a result of this, the input video signal is displayed by being enhanced with a $\gamma$ curve according to Max luminance determined by area active control from T3 to T4. For example, in a case where Max luminance is 1500 (cd/m$^2$), when the input video signal has a maximum tone value (255), screen luminance is 1500 (cd/m$^2$). The Max luminance in this case is Max luminance that is determined according to an average lighting rate determined based on the video signal and a result of detecting surrounding brightness by brightness detection processing.

On the other hand, in the case of an input tone value from T1 to T2, as described above, the first gain G1 is applied to the video signal so as to reduce an increment of screen luminance by luminance stretching of the backlight, so that the screen is displayed with the $\gamma$ curve based on reference luminance. This is because an output value of the video signal is suppressed in a range smaller than the threshold Th1 (corresponding to T2) in response to a quantity of luminance stretching in the mapping portion 13 in accordance with Max luminance determined by the area-active-control/luminance-stretching portion 14. T2 to T3 has screen luminance shifted according to tone mapping of Th2 to Th1.

As Max luminance increases, there is a larger difference in a screen luminance direction between a curve based on reference luminance from T1 to T2 and a curve based on Max luminance from T3 to T4. As described above, the curve based on the reference luminance is a $\gamma$ curve in which screen luminance of a maximum tone value becomes reference luminance when backlight luminance is not stretched (as an example, screen luminance of a maximum tone value is 550 cd/m$^2$), and the curve based on Max luminance is a $\gamma$ curve in which screen luminance of a maximum tone value becomes Max luminance determined by the area-active-control/luminance-stretching portion 14.

In this manner, screen luminance is controlled with the reference luminance while the input video signal is from 0 tone (T1) to T2. In the case of a dark video with a low tone, when being displayed with increased luminance, deterioration of quality such as reduction of contrast and black float is caused, so that luminance is suppressed by video signal processing only by a quantity of luminance stretching of the backlight so as not to increase the screen luminance.

Further, since a range where the input video signal is at T3 or more is a range that is regarded as emitting light, the video signal is maintained without being suppressed in a state where the backlight is stretched by luminance stretching. Thereby, the screen luminance is enhanced to allow display of a high-definition image having more feeling of brightness.

In this case, for example, when surrounding brightness becomes dark and Max luminance is suppressed due to the detection result of the brightness detection portion 19, a difference in the screen luminance direction between the curve based on reference luminance from T1 to T2 and the curve based on Max luminance from T3 to T4 becomes small. That is, as Max luminance that is determined according to a quantity of surrounding brightness detected by the brightness detection portion becomes small, the curve from T3 to T4 shifts to a low-luminance side. Moreover, since a position of T2 corresponds to the position of the first threshold Th1 that changes according to the result of detecting surrounding brightness, when the surroundings become dark, the position of 12 also shifts to a high-tone side of the input signal, resulting in display with contrast feeling focused. Note that, the $\gamma$ curve from T1 to T2 does not need to conform to the reference luminance, and is able to be set by appropriately adjusting the gain G1, as long as having a level of giving a difference from an enhanced area of a light emitting part.

Embodiment 2

Figure 15:
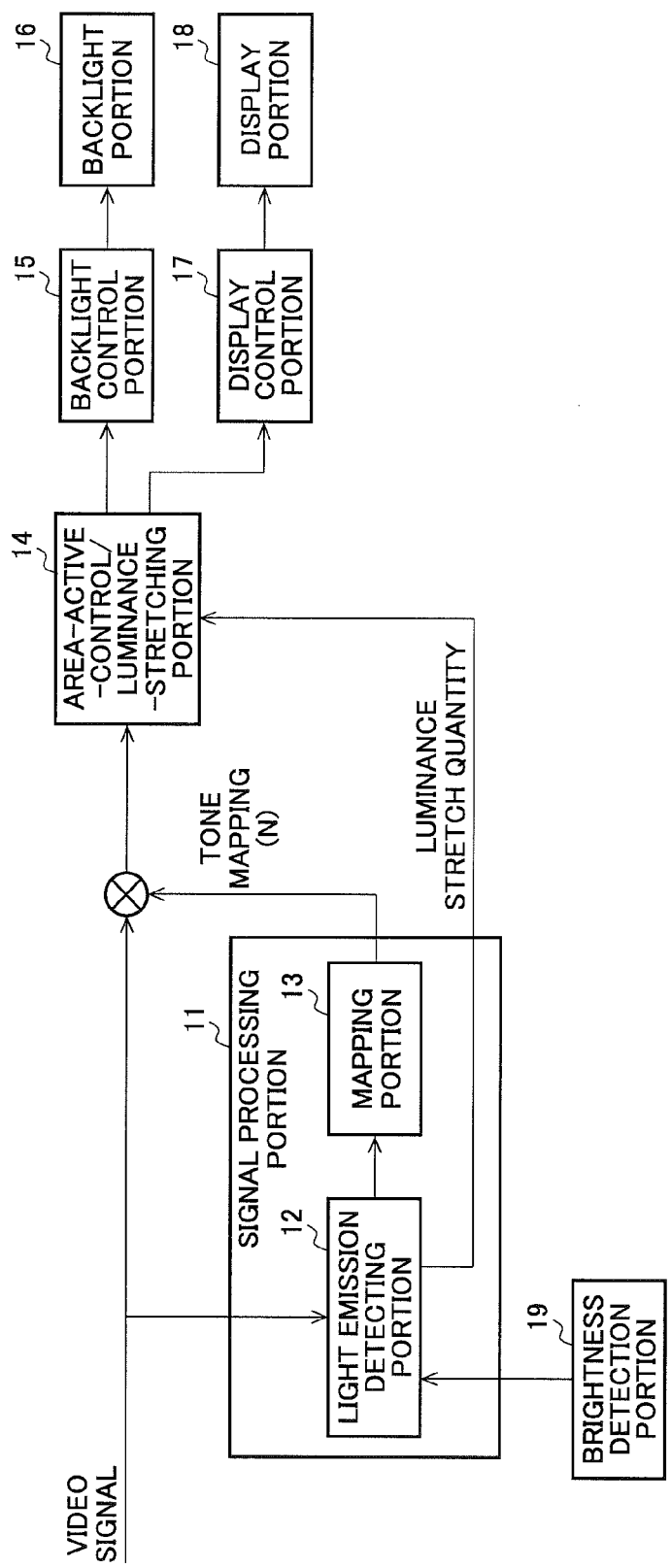
FIG. 15 is a diagram explaining another embodiment of the video display device according to the present invention.

FIG. 15 is a diagram explaining another embodiment of the video display device according to the present invention.

A second embodiment has the same configuration as the first embodiment, but, differently from the first embodiment, determines a luminance stretch quantity based on a detection result of the light emission detecting portion 12 and the brightness detection portion 19 to execute tone mapping based on the determined luminance stretch quantity, without determining a value of Max luminance, which is used when performing tone mapping, by the area-active-control/luminance-stretching portion 14. Accordingly, the mapping portion 13 of the signal processing portion 11 does not need to cause the area-active-control/luminance-stretching portion 14 to output a value of Max luminance by luminance stretching like the embodiment 1.

In the same manner as the embodiment 1, the brightness detection portion 19 is provided with a brightness sensor, such as a photodiode, that detects brightness surrounding the video display device (surrounding illumination), and a detection result by the brightness detection portion is output to the light emission detecting portion 12.

Figure 16:
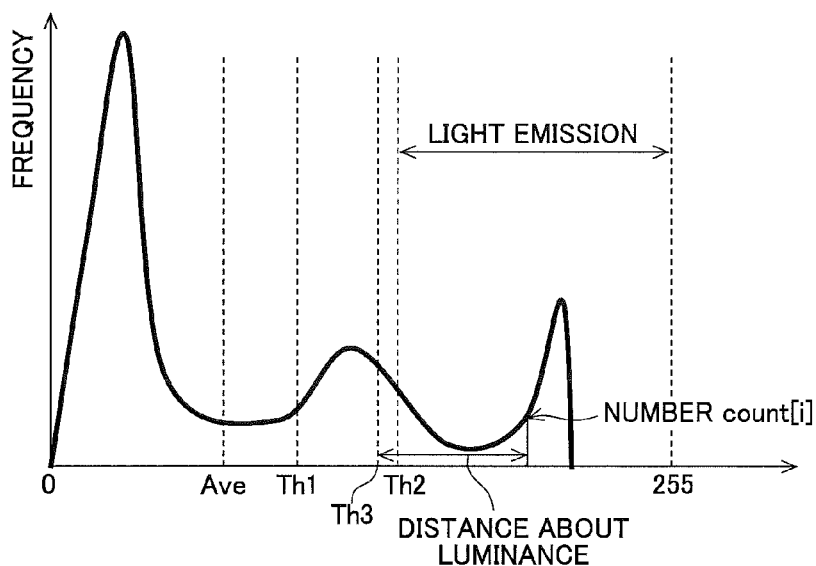
FIG. 16 shows an example of a Y histogram generated from a luminance signal Y of an input video signal.

FIG. 16 shows an example of a Y histogram generated from a luminance signal Y of an input video signal. In the same manner as the embodiment 1, the light emission detecting portion 12 integrates the number of pixels for each luminance tone of pixels to generate a Y histogram for each frame of an input video signal, by using luminance as a feature quantity of a video. Then, an average value (Ave) and a standard deviation (σ) are calculated from the Y histogram, and two thresholds Th1 and Th2 are calculated by using them. In the same manner as the embodiment 1, the second threshold Th2 defines a light emitting boundary and a pixel not less than this threshold Th2 is regarded as a part that emits light in the Y histogram. As the feature quantity of a video, other feature quantity described below is able to be used, but luminance is set to be used here.

In the present embodiment, in addition to the first threshold Th1 and the second threshold Th2 of the embodiment 1, a third threshold Th3 is further set. The third threshold Th3 exists between Th1 and Th2 and is provided to detect a state of a pixel of a light emitting part.

The threshold Th3 may have the same value as Th2, but is provided having a large margin for a light emitting part having Th2 or more in order to facilitate processing.

Therefore, given is $$Th3 = Ave + Q\sigma (M < Q \le N) \quad \text{expression (5)}$$

Figure 17:
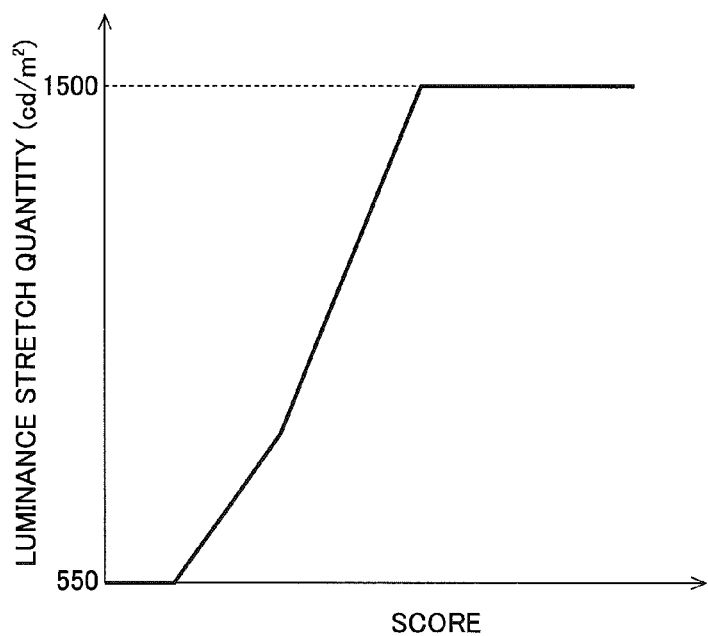
FIG. 17 is a diagram showing exemplary calculation of a luminance stretch quantity according to a pixel not less than a third threshold Th3.

FIG. 17 is a diagram showing exemplary calculation of a luminance stretch quantity according to a pixel not less than the third threshold Th3. A horizontal axis indicates a score of a pixel value not less than the third threshold Th3, and a vertical axis indicates a luminance stretch quantity according to the score. The score corresponds to an example of an index associated with brightness according to the present invention.

The score shows a degree of brightness by being defined as [proportion of a pixel not less than a certain threshold]× [distance from the threshold (difference of luminance)] for counting the number of pixels of a pixel having a tone value larger than the third threshold Th3 to calculate a weighted distance from the threshold Th3, and, for example, is calculated by an expression (6) below:

[Formula 1]

$$\text{Score} = 1000 \times \sum_{i > Th3} \{(\text{count}[i] \times (i^2 - (Th3)^2) / (\text{Total Number of Pixels} \times (Th3)^2)\} \quad (6)$$

Figure 20:
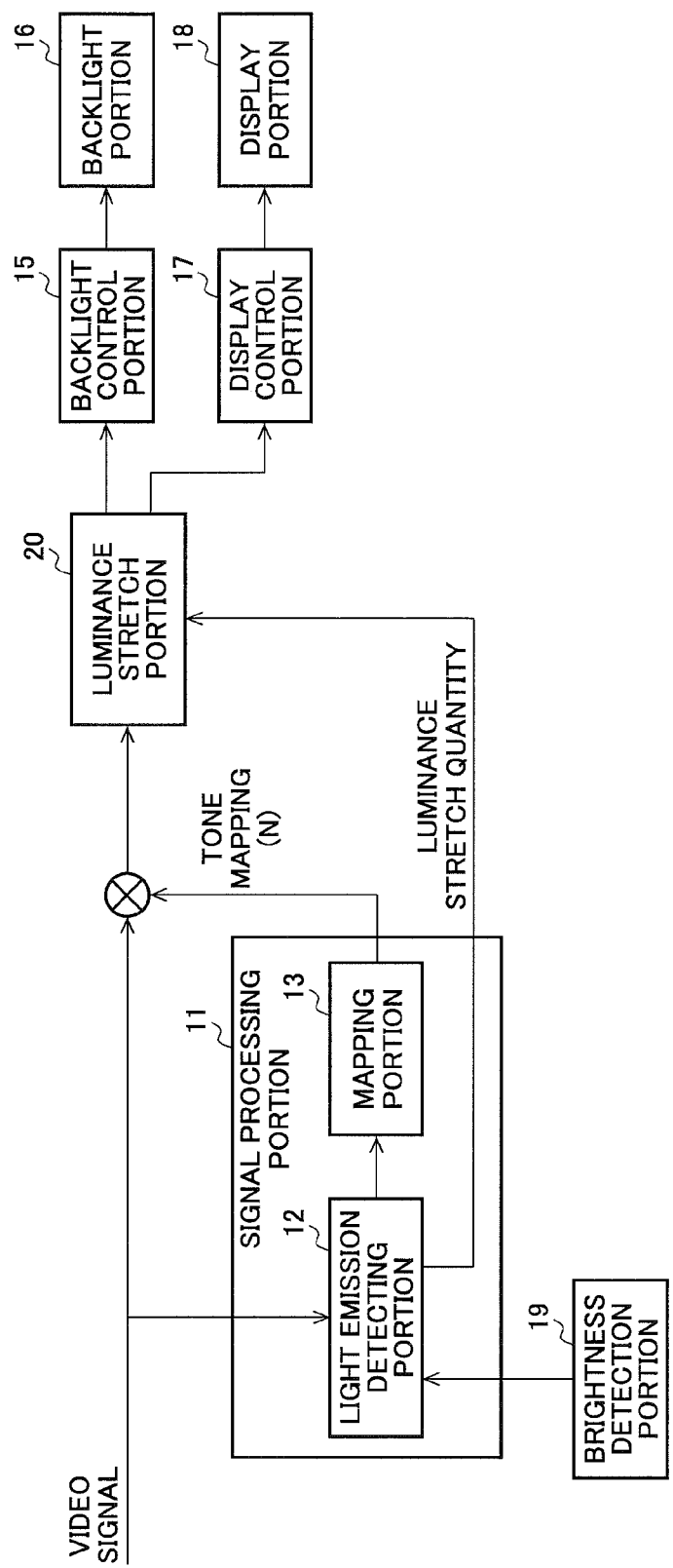
FIG. 20 is a diagram explaining still another embodiment of the video display device according to the present invention.

In the expression (6), count [i] is a count of the number of pixels with respect to a tone value i. Further $i^2-(Thresh3)^2$ indicates a distance as to luminance (difference of luminance) as shown in FIG. 20, and may adopt a distance from a threshold in lightness L* instead. Note that, this square represents luminance, which is actually 2.2th power. That is, when a value of a digital code is i, the luminance becomes $i^{2.2}$. At this time, the lightness L* becomes $(i^{2.2})^{1/3} \approx i$. As a result of verification with an actual video display device, a difference from a threshold in the luminance is more effective than a difference from a threshold in the lightness and the like. Further, in the expression (6), the total number of pixels indicates a value obtained by counting the number of all pixels regardless of i>Th3. If such a calculation value is adopted as the score, when there are a lot of high-tone pixels away from Th3 in a light emitting part, the score becomes high. Furthermore, even when the number of pixels not less than Th3 is fixed, the score becomes higher when there are a lot of high-tone pixels. The number of pixels of a pixel having a tone value not less than the third threshold Th3 is counted to calculate a weighted distance from the threshold Th3 for showing a degree of brightness, and, for example, calculation is performed by:

$$\text{Score} = 1000 \times \Sigma\text{count}[i] \times (i^2 - Th3^2)/(\Sigma\text{count}[i] \times Th3^2) \quad \text{expression (6)}$$

Σcount[i] is integration by counting the number of pixels for each tone value i. Therefore, when there are a lot of high-tone pixels away from Th3 in a light emitting part, the score become high. Furthermore, even when the number of pixels not less than Th3 is fixed, the score becomes higher when there are a lot of high-tone pixels.

Then, in the case of having a score in a certain level or higher, a luminance stretch quantity is set high to increase feeling of brightness by stretching a brilliant video having a high tone so as to have much higher luminance. In this example, in a part having a certain level or higher score, possible maximum screen luminance reached after luminance stretching is set to 1500 (cd/m²). Moreover, when the score is low, it is set so that a luminance stretch quantity becomes small as the score becomes small. Furthermore, the light emission detecting portion 12 changes a control curve that prescribes a relation between the score and a luminance stretch quantity according to the result of detecting surrounding brightness in the brightness detection portion 19. This luminance stretch quantity has the same concept as Max luminance of the first embodiment and is indicated by, for example, a value of backlight duty.

Figure 18:
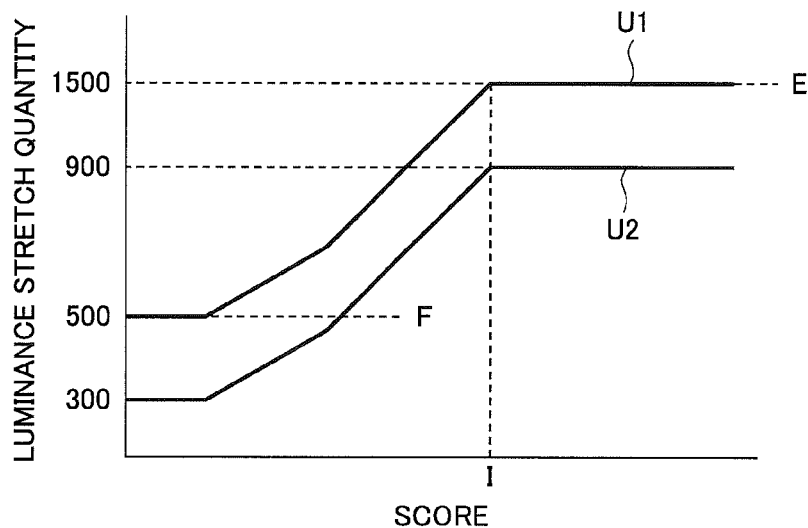
FIG. 18 is a diagram explaining exemplary setting of a control curve of a luminance stretch quantity that is changed according to a result of detecting surrounding brightness.

FIG. 18 is a diagram explaining exemplary setting of a control curve of a luminance stretch quantity that is changed according to a result of detecting surrounding brightness. The light emission detecting portion 12 determines a luminance stretch quantity according to a score of a pixel value not less than the threshold Th3 as described above, and changes a control curve that defines a relation between the score and the luminance stretch quantity at this time according to the result of detecting surrounding brightness output from the brightness detection portion 19.

For example, as shown in FIG. 18, a control curve of luminance stretching is prepared in two steps for controlling with a control curve U1 when surrounding brightness is bright, and controlling with a control curve U2 when surrounding brightness is dark. As to the bright case and the dark case, a predetermined threshold is set to a signal showing a result of brightness detection and the threshold is compared to the detection result to judge whether the surroundings are brighter or darker than a predetermined level. For example, when surrounding illumination (lux) is detected by a brightness sensor with photodiode, a threshold of illumination is predefined and whether to be a bright environment or a dark environment is judged in accordance with the surrounding illumination based on the detection result.

In the control curve of FIG. 18, it is set that a level of the maximum luminance stretch quantity in an entire range of the score is B, a level of the minimum luminance stretch quantity in the entire range of the score is F, and a score at a point where the luminance stretch quantity starts to be reduced from the level E of the maximum luminance stretch quantity as the score decreases is I. In the example of FIG. 18, in the control curve U1 when the surrounding brightness is bright, E is about 1500 cd/m$^2$ and F is 500 cd/m$^2$, while in the control curve U2 when the surrounding brightness is dark, E is reduced to about 900 cd/m$^2$ and F is reduced to 300 cd/m$^2$, respectively. In this manner, proportion of the level E to the level F is set to about 1.5 to 3 times, so that the control curves are reduced to a low-luminance stretch quantity side entirely with reduction of surrounding illumination.

With the control as described above, in the control curve U1 when the surroundings are bright, feeling of brightness is increased by the high luminance stretch quantity, and luminance is reduced by video signal processing in an area excluding a light emitting part, thus making it possible to represent a high-definition video having high contrast feeling. Further, in the case of a dark image having an almost minimum score, the luminance stretch quantity is reduced so as to reduce black float of a dark video.

On the other hand, in the control curve U2 when the surroundings are dark, the luminance stretch quantity is set low to thereby suppress feeling of dazzling. Further, in an area where a video is dark having a low score, the luminance stretch quantity is further reduced than the control curve U1. Since feeling of black float on a screen due to luminance stretching becomes more prominent in a dark surrounding environment, the luminance stretch quantity is kept even lower so that black float does not become prominent. In this example, the point I where a level of the luminance stretch quantity changes is not changed depending on surrounding brightness to be maintained.

Note that, though the control curve is set in two steps in the example of FIG. 18, it is possible to control in a plurality of steps of three or more steps without limitation to two steps. In addition, a control curve may be generated for each time so as to change in a stepless manner. When a threshold is provided in multiple steps to perform control in multiple steps according to surrounding illumination, the control curve is changed in a stepwise manner in a direction from the control curve U1 to U2 as the surrounding brightness becomes dark.

Figure 19:
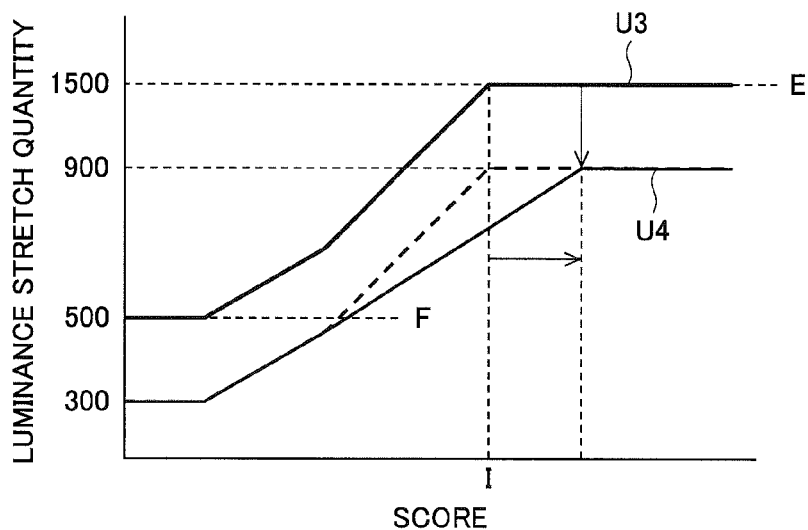
FIG. 19 is a diagram explaining another exemplary setting of a control curve of a luminance stretch quantity that is changed according to a result of detecting surrounding brightness.

FIG. 19 is a diagram explaining another exemplary setting of a control curve of a luminance stretch quantity that is changed according to the result of detecting surrounding brightness. In the example of FIG. 19, a control curve that defines a relation between the score and the luminance stretch quantity is changed according to the result of detecting surrounding brightness by the brightness detection portion 19 in the same manner as the example of FIG. 18.

Here, the control curve of the luminance stretch quantity is prepared in two steps for controlling with a control curve 3 when surrounding brightness is bright, and controlling with a control curve U4 when surrounding brightness is dark. As to the bright case and the dark case, a predetermined threshold is set to a signal showing a detection result and the threshold is compared to the detection result to judge whether the surroundings are brighter or darker than a predetermined level, in the same manner as the above.

In the example of FIG. 19, though the control curves are reduced from U3 to U4 entirely as surrounding brightness becomes darker in the same manner as the example of FIG. 18, the position of the point I is also changed according to surrounding brightness differently from the example of FIG. 18. That is, in the control curve U4 having dark surrounding brightness, the position of the point I is shifted to a high-score side compared to the control curve U3 having bright surrounding brightness. Thereby, when the surroundings are dark, even for a bright video whose score is high to some extent, the luminance stretch quantity is suppressed to prevent feeling of dazzling.

Note that, though the control curve is set in two steps in the example of FIG. 19, it is possible to control in a plurality of steps of three or more steps without limitation to two steps. In addition, a control curve may be generated for each time so as to change in a stepless manner according to surrounding brightness.

Next, the light emission detecting portion 12 changes the position of the first threshold Th1 in the Y histogram according to the detection result of the brightness detection portion 19 through the same processing as the embodiment 1. For example, as described in the embodiment 1, as the brightness detected by the brightness detection portion 19 becomes darker, the value of M is increased and the first threshold Th1 is shifted to the high-luminance side. Thereby, the position of the first threshold Th1 is shifted to the high-luminance side in an environment where the surroundings are dark and sharpness of image quality is emphasized in the dark environment, resulting in image quality focusing contrast feeling. On the other hand, in an environment where the surroundings are bright, the first threshold Th1 is maintained on the low-luminance side to result in image quality focusing brightness of a screen.

The values of the first and second thresholds Th1 and Th2 output from the light emission detecting portion 12, and the luminance stretch quantity determined in accordance with a score of a pixel not less than Th3 are output to the mapping portion 13 and used to generate tone mapping.

Processing of tone mapping at the mapping portion 13 is the same as the first embodiment. That is, as shown in FIG. 13, the first gain G1 is set to an area smaller than the first threshold Th1 set by the light emission detecting portion 12, and the second gain G2 is set so as to linearly connect between Th1 and Th2. At this time, when setting the gain G1, the luminance stretch quantity determined according to the result of detecting surrounding brightness by the brightness detection portion 19 is used to reduce luminance by video signal processing according to the luminance stretch quantity of the backlight. In this case, as shown in FIG. 12, as surrounding brightness becomes darker, the first threshold Th1 is shifted to the high-luminance side, so that a tone in a low-luminance area is kept low in a wider range, thus enabling image quality focusing contrast feeling more. The obtained tone mapping is applied to the input video signal and input to the area-active-control/luminance-stretching portion 14.

The processing in the area-active-control/luminance-stretching portion 14 is the same as the embodiment 1. However, the area-active-control/luminance-stretching portion 14 does not need to determine Max luminance from an average lighting rate of the backlight to be output to the signal processing portion like the embodiment 1, and to the contrary, stretches luminance of an LED of the backlight portion 16 based on the luminance stretch quantity output from the light emission detecting portion 12 of the signal processing portion 11.

That is, the area-active-control/luminance-stretching portion 14 divides a video into a predetermined plurality of areas to extract a maximum tone value of a video signal for each of the divided areas, and determines a lighting rate of an LED for each area according to the extracted maximum tone value. For example, for a dark area with a low maximum tone value, the lighting rate is decreased to reduce luminance of the backlight. Then, electricity powered to the entire backlight is increased according to the luminance stretch quantity output from the light emission detecting portion 12 in this state to entirely up luminance of the backlight. Thereby, a bright video that emits light becomes brighter and feeling of brightness is increased. Moreover, in a non-light emitting part, luminance corresponding to luminance stretching is reduced by video signal processing, resulting that only a light emitting part on a screen has higher luminance, so that a high-definition video with high contrast is able to be displayed. The relation between an input video signal and screen luminance is the same as FIG. 14 shown in the first embodiment.

Embodiment 3

FIG. 20 is a diagram explaining still another embodiment of the video display device according to the present invention.

A third embodiment has the same configuration as the second embodiment for performing the same operation as the second embodiment, but, differently from the second embodiment, a luminance-stretching portion 20 stretches luminance of the backlight portion 16 based on a luminance stretch quantity output from the light emission detecting portion 12 of the signal processing portion 11 without performing area active control.

That is, the luminance-stretching portion 20 inputs a video signal to which tone mapping generated by the mapping portion 13 is applied to output control data displaying the video signal to the display control portion 17. At this time, processing by area active control is not performed. On the other hand, the entire backlight portion 16 is uniformly stretched based on the luminance stretch quantity output from the light emission detecting portion 12.

Thereby, a bright video that emits light becomes brighter and feeling of brightness is increased. Moreover, in a non-light emitting part, luminance corresponding to luminance stretching is reduced by video signal processing, resulting that luminance becomes high in a light emitting part on a screen, so that a high-definition video with high contrast is able to be displayed.

Operation for other components in the third embodiment is the same as the second embodiment, so that repetitive description will be omitted.

(Other Feature Quantity)

In the above-described respective examples, the luminance Y is used as a feature quantity in processing for detecting a light emitting part by the light emission detecting portion 12 and a luminance histogram is generated to detect a light emitting part therefrom. As the feature quantity for generating the histogram, in addition to luminance, for example, a CMI (Color Mode Index) or Max RGB is able to be used.

The CMI is an index showing how bright a focused color is. Here, differently from luminance, the CMI shows brightness to which color information is also added. The CMI is defined by:

$$L^*/L^*\text{modeboundary} \times 100 \quad\quad \text{expression (7)}$$

The above-described L* is an index of relative brightness of a color, and the case of L*=100 provides lightness of the brightest white as an object color. In the above-described expression (7), L* is lightness of a focused color, and L*modeboundary is a lightness of a boundary appearing like emitting light with the same chromaticity as the focused color. Here, it is found that lightness is provided as L*modeboundary optimal color (brightest color of object colors). Lightness of a color provided as CMI=100 is referred to as a light emitting color boundary, and defined that light is emitted when exceeding CMI=100.

Figure 21:
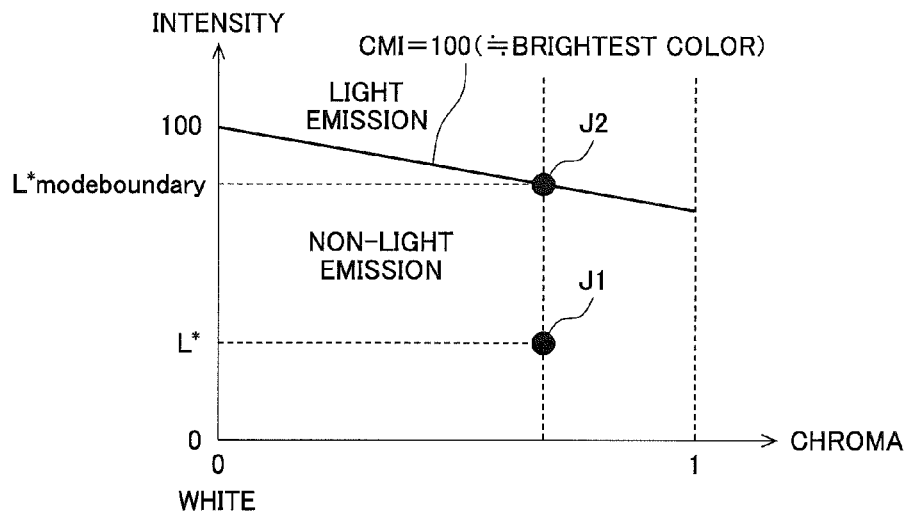
FIG. 21 is a diagram explaining a method for calculating a CMI from a broadcast video signal to be displayed on the video display device.

A method for calculating the CMI from a broadcast video signal to be displayed on the video display device will be described with reference to FIG. 21. A broadcast video signal is standardized to be transmitted based on the BT.709 standard. Therefore, first, RGB data of the broadcast video signal is converted into data of a tristimulus value XYZ using a conversion matrix for the BT.709. Then, the lightness L* is calculated using a conversion equation from Y. It is set that L* of the focused color is at a position J1 of FIG. 20. Chromaticity is then calculated from the converted XYZ to examine L* of an optimal color with the same chromaticity as the focused color (L*modeboundary) from known data of the optimal color. The position on FIG. 21 is J2.

From these values, the CMI is calculated using the above-described expression (7). The CMI is shown by a ratio of L* of a focused pixel to L* of an optimal color with the chromaticity thereof (L*modeboudary).

The CMI is obtained by the above-described method for each pixel of a video signal. With the standardized broadcast signal, all pixels take any one of the CMIs falling within a range 0 to 100. Then, for one frame of a video, a CMI histogram is created with a horizontal axis as a CMI and a vertical axis as frequency. Here, the average value Ave. and the standard deviation σ are calculated to set each threshold for detecting a light emitting part.

Further, in another example, a feature quantity is data having a maximum tone value of RGB data (Max RGB). Having two colors with the same chromaticity in a combination of RGB means the same as that a ratio of RGB is not changed. That is, processing for operating an optimal color with the same chromaticity in the CMI is processing for obtaining a combination of RGB having the largest tone of RGB data when the ratio of RGB data is not changed to be multiplied by a fixed number.

Figure 22:
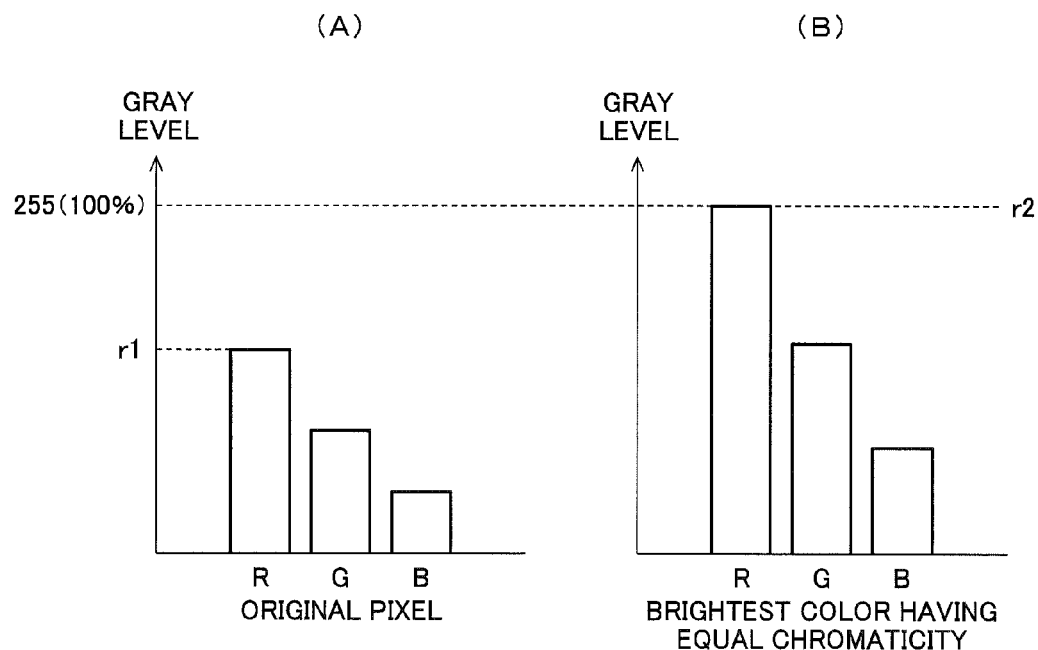
FIG. 22 is a diagram explaining a maximum tone value of RGB used as a feature quantity.

For example, it is set that a pixel having RGB data with a tone as shown in FIG. 22(A) is a focused pixel. When RGB data of the focused pixel is multiplied by a fixed number, a color when any of RGB is first saturated is the brightest color with the same chromaticity as an original pixel, as shown in FIG. 22(B). Then, when a tone of the focused pixel of the color which is first saturated (in this case, R) is r1, and a tone of R of an optimal color is r2, the value similar to the CMI is able to be obtained by:

$$r1/r2 \times 100 \qquad \text{expression (8)}$$

The color which is first saturated when RGB is multiplied by a fixed number is a color having a maximum tone of RGB of the focused pixel.

The value by the above-described expression (8) is then calculated to create a histogram for each pixel. The average value Ave. and the standard deviation σ are calculated from this histogram to set each threshold so that a light emitting part is able to be detected or a quantity of black is able to be detected. The histogram at this time may be one for integrating the maximum tone values of RGB of pixels without being converted into values of 0 to 100 in accordance with the expression (8).

EXPLANATIONS OF LETTERS OR NUMERALS

11 . . . signal processing portion, 12 . . . light emission detecting portion, 13 . . . mapping portion, 14 . . . area-active-control/luminance-stretching portion, 15 . . . backlight control portion, 16 . . . backlight portion, 17 . . . display control portion, 18 . . . display portion, 19 . . . detection portion, and 20 . . . luminance-stretching portion.

The invention claimed is:

1. An apparatus, comprising:
a display device displaying an input video signal;
a light source for illuminating the display device;
a brightness detector detecting brightness surrounding the apparatus; and
a processor and a storage device storing instructions that are operable, when executed by the processor, to cause the processor to control the display device and the light source including:
stretching and increasing luminance of the light source based on control curves that define a relation between an index associated with brightness calculated based on a predetermined condition from the input video signal and a luminance stretch quantity for stretching the luminance of the light source,
detecting a light emitting part that is regarded as a video emitting light based on a predetermined feature quantity of the input video signal, and enhancing display luminance of the light emitting part by reducing luminance of a video signal of a non-light emitting part excluding the light emitting part, and
switching the control curves according to the brightness surrounding the apparatus detected by the brightness detector
the processor and storage device storing further instructions that are operable, when executed by the processor, to cause the processor to:
divide an image by the input video signal into a plurality of areas, and change a corresponding lighting rate of the light source for each of the areas based on a tone value of a video signal of the divided area,
wherein the control curve is a control curve that defines a relation between an average lighting rate obtained by averaging the lighting rates corresponding to all areas and the luminance stretch quantity shown by possible maximum luminance on a screen of the display device, and
using the average lighting rate as the index associated with the brightness to stretch the luminance of the light source based on the maximum luminance defined in accordance with the average lighting rate.

2. The apparatus as defined in claim 1, wherein
the processor and storage device storing further instructions that are operable, when executed by the processor, to cause the processor to:
perform video processing for outputting by converting an input tone of the input video signal,
wherein input/output characteristics that define a relation between the input tone and an output tone have a threshold that is defined in an area of a non-light emitting part having a lower tone than that of a boundary of the light emitting part and the non-light emitting part, and
predefine a relation between a gain applied to the video signal and the luminance stretch quantity, and determine a gain by which the output tone is reduced with respect to the input tone of the input video signal in accordance with the luminance stretch quantity and applies the determined gain to an area having a lower tone than the threshold to perform the video processing, and moves the threshold to a high-luminance side as the brightness detected by the brightness detection portion becomes darker in the video processing.

3. The apparatus as defined in claim 2, the processor and storage device storing further instructions that are operable, when executed by the processor, to cause the processor to:
reduce an increment of display luminance of the display portion by stretching of the luminance of the light source through the video processing in a predetermined area having the low feature quantity.

4. An apparatus, comprising:
a display device displaying an input video signal;
a light source for illuminating the display device;
a brightness detector detecting brightness surrounding the apparatus; and
a processor and a storage device storing instructions that are operable, when executed by the processor, to cause the processor to control the display device and the light source including:
stretching and increasing luminance of the light source based on control curves that define a relation between an index associated with brightness calculated based on a predetermined condition from the input video signal and a luminance stretch quantity for stretching the luminance of the light source,
detecting a light emitting part that is regarded as a video emitting light based on a predetermined feature quantity of the input video signal, and enhancing display luminance of the light emitting part by reducing luminance of a video signal of a non-light emitting part excluding the light emitting part, and
switching the control curves according to the brightness surrounding the apparatus detected by the brightness detector, wherein
the control curve is a control curve that has the luminance stretch quantity which becomes smaller as the brightness detected by the brightness detection portion reduces.

5. A television receiving device including the apparatus as defined in claim 4.

6. An apparatus, comprising:
a display device displaying an input video signal;
a light source for illuminating the display device;
a brightness detector detecting brightness surrounding the apparatus; and a processor and a storage device storing instructions that are operable, when executed by the processor, to cause the processor to control the display device and the light source including:

stretching and increasing luminance of the light source based on control curves that define a relation between an index associated with brightness calculated based on a predetermined condition from the input video signal and a luminance stretch quantity for stretching the luminance of the light source, detecting a light emitting part that is regarded as a video emitting light based on a predetermined feature quantity of the input video signal, and enhancing display luminance of the light emitting part by reducing luminance of a video signal of a non-light emitting part excluding the light emitting part, and switching the control curves according to the brightness surrounding the apparatus detected by the brightness detector, wherein the control curve is a control curve that defines a relation between a score obtained by counting the number of pixels by weighting brightness of each pixel and the luminance stretch quantity with respect to a video in a predetermined range including an area of the detected light emitting part, and the processor and storage device storing further instructions that are operable, when executed by the processor, to cause the processor to:

use the score as the index associated with the brightness to stretch the luminance of the light source based on the score that is calculated from the input video signal.

* * * * *